United States Patent [19]

Tsutsui et al.

[11] Patent Number: 4,967,794
[45] Date of Patent: Nov. 6, 1990

[54] AUTOMATICALLY OPERATING VALVE FOR REGULATING WATER FLOW AND FAUCET PROVIDED WITH SAID VALVE

[75] Inventors: Osamu Tsutsui; Hisato Haraga; Kinya Arita; Atsuo Makita; Hirofumi Takeuchi; Ryoichi Tsukada, all of Chigasaki, Japan

[73] Assignee: Toto Ltd., Fukuoka, Japan

[21] Appl. No.: 343,984

[22] Filed: Apr. 26, 1989

[30] Foreign Application Priority Data

Sep. 30, 1987 [JP] Japan .................................. 62-248944
Feb. 6, 1988 [JP] Japan .................................. 63-26169
Feb. 23, 1988 [JP] Japan .................................. 63-41094
Mar. 17, 1988 [JP] Japan .................................. 63-65277

[51] Int. Cl.⁵ ........................ F16K 11/22; F16K 31/02
[52] U.S. Cl. ..................................... 137/597; 137/606; 137/883; 251/124.06
[58] Field of Search ............... 137/597, 606, 607, 870, 137/883; 251/129.04, 129.06

[56] References Cited

U.S. PATENT DOCUMENTS

| | | | |
|---|---|---|---|
| 1,064,966 | 6/1913 | Glass .................................. | 137/597 |
| 3,181,790 | 5/1965 | Smith ............................... | 137/607 X |
| 3,182,684 | 5/1965 | Hutchison ......................... | 137/606 |
| 4,284,263 | 8/1981 | Newcomb ....................... | 251/129.06 |
| 4,444,215 | 4/1984 | Zukansky ........................... | 137/597 |
| 4,559,971 | 12/1985 | Bradshaw ....................... | 137/870 X |
| 4,685,156 | 8/1987 | Brabazon ......................... | 137/597 X |
| 4,695,034 | 9/1987 | Shimizu et al. ................. | 257/129.06 |
| 4,753,265 | 6/1988 | Barrett et al. .................... | 137/597 X |

Primary Examiner—Stephen M. Hepperle
Attorney, Agent, or Firm—Jordan and Hamburg

[57] ABSTRACT

An automatically operating valve for regulating water flow, especially a mixing valve for automatically mixing hot water and cold water to obtain a mixed water of a desired temperature is characterized by employing piezoelectric actuators for operating valve bodies thereof. Due to such a construction, the valve can not only fully close or open but also carries out the fine flow amount control by regulating the opening rate or angle of the valve body. Especially in case the automatically operating valve is a mixing valve, the mixing ratio of hot water and cold water can be accurately regulated so that the mixed water of a desired temperature can be always automatically obtained.

11 Claims, 24 Drawing Sheets

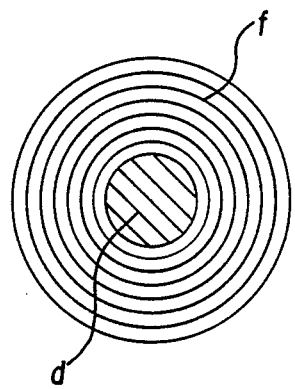
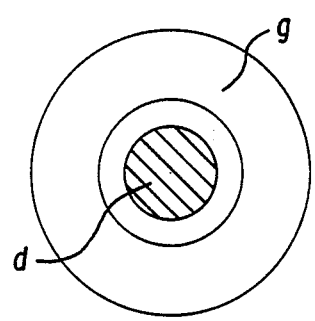
FIG. 2  FIG. 3
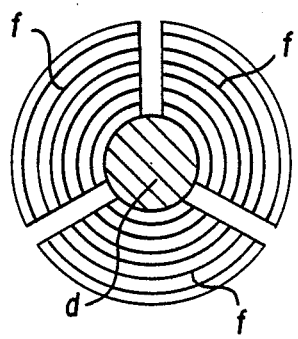
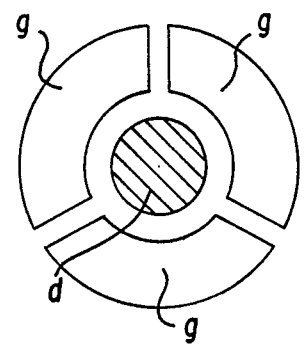
FIG. 4  FIG. 5

AUTOMATICALLY OPERATING VALVE FOR REGULATING WATER FLOW AND FAUCET PROVIDED WITH SAID VALVE This is a division of application Ser. No. 246,461, pending filed Sept. 19, 1988.

STATE OF ART

The present invention relates to an automatically operating valve for regulating water flow and a faucet which is provided with such a valve.

BACKGROUND OF INVENTION

Conventional automatically operating valves substantially comprise valves which are operated by solenoid drivers and valves which are operated by power-operated motors.

Upon receiving a drive signal or a drive output from a sensor or an operating switch, the valve body of such valve is moved by the solenoid driver of the power-operated motor toward or away from the valve seat to automatically close or open the valve.

The actuator of the conventional operating valves, however, is either made of the solenoid driver or the power-operated motor so that high resolution cannot be achieved with respect to the movement of the valve body of such coventional actuator, whereby, the valve cannot accurately control the water flow although the simple opening or closing of the valve can be achieved.

Especially, the application of such an automatically operating valve to a mixing valve for producing water of a desired temperature is almost impossible or extremely difficult since it requires an extremely fine regulation of the movement of the valve body to mix hot water and cold water to obtain the water of a desired temperature.

Accordingly, it is an object of the present invention to provide an automatically operating valve which can resolve the above drawbacks of the conventional valves by utilizing piezoelectric actuators as the drive means of the valve, wherein these piezoelectric actuators can finely regulate the opening rate or angle of the valve whereby the water flow can be accurately adjusted.

It is another object of the present invention to provide a mixing valve provided with piezoelectric actuators which can finely and accurately adjust the mixing ratio of hot water with cold water to produce a water of a desired temperature.

It is still another object of the present invention to provide an automatically operating valve provided with piezoelectric actuators which can be assembled in a compact form and can be mounted readily and easily on any place.

It is a further object of the present invention to provide an automatically operating valve provided with piezoelectric actuators which can completely close the valve by automatically or manually moving the valve body toward the valve seat in case of emergency such as at the time of a power failure or cutting off of the electricity, whereby the leakage of water can be prevented, thereby enabling the saving of water.

It is a still further object of the present invention to provide an automatically operating valve provided with piezoelectric actuators which can completely close the valve by automatically moving the valve body utilizing the biasing force of the spring and deenergizing the clamping piezoelectric elements in case of emergency such as at the time of water-stoppage-mode operation power, whereby the leakage of water can be prevented, thereby enabling the saving of water.

It is even a still further object of the present invention to provide an automatically operating valve provided with piezoelectric actuators, wherein the front tip of the plunger is formed as a separate element from the plunger and is biased by a spring to apply a biasing force to the valve body, whereby even when an impulse water pressure is generated in the water passage, only the front tip of the plunger is moved backward so that the position of piezoelectric elements relative to the plunger can be held unchanged, thereby the fine adjustment of the water flow can be acheived throughout the flow regulating operation.

It is even a still further object of the present invention to provide an automatically operating valve provided with piezoelectric actuators, wherein the front tip of the plunger is constricted to have a diameter smaller than the remaining part of the plunger, whereby the water pressure which the plunger receives on the tip end of the plunger can be minimized and the plunger can be extended or retracted accurately by the actuation of the piezoelectric elements resulting in the fine adjustment of the water flow.

It is even a still further object of the present invention to provide a faucet which compactly incorporates a mixing valve provided with piezoelectric actuators therein so that the faucet can be compactly mounted on any part of the washroom whereby the remaining space of the washroom can be efficiently utilized.

In summary, the present invention discloses an automatically operating valve for regulating water flow comprising a casing, an inflow passage formed in one side of the casing, an outflow passage formed in the other side of the casing, a valve seat formed in a communicating passage which connects the inflow passage and the outflow passage, a valve body retractably mounted on the valve seat and a piezoelectric actuator for moving the valve body towards and away from the valve seat.

The present invention also discloses a mixing valve for mixing hot water with cold water to produce water of a desired temperature comprising a casing, a cold water inflow passage and hot water inflow passage formed in one side of the casing, a mixture outflow passage formed in the other side of the casing, a valve seat formed in a communicating passage which connects the inflow passage and the outflow passage, valve bodies retractably mounted on the valve seats and piezoelectric actuators for moving the valve bodies towards and away from the valve seats.

The present invention also discloses a faucet provided with the above-mentioned mixing valve at the proximal end thereof for enabling the fine flow control and the fine temperature control of the water tapped from the outlet of the faucet.

BRIEF EXPLANATION OF DRAWINGS

FIG. 2 and FIG. 3 are cross-sectional views of the above valve taken along the lines I—I and II—II of FIG. 1.

FIG. 4 and FIG. 5 are cross-sectional views of modifications of piezoelectric element applicable to the valve of this embodiment.

BEST MODE FOR CARRYING OUT THE INVENTION

The automatic operating valve for regulating water flow and the faucet provided with such a valve are described in detail in conjunction with attached drawings.

First Embodiment

Figure 1:
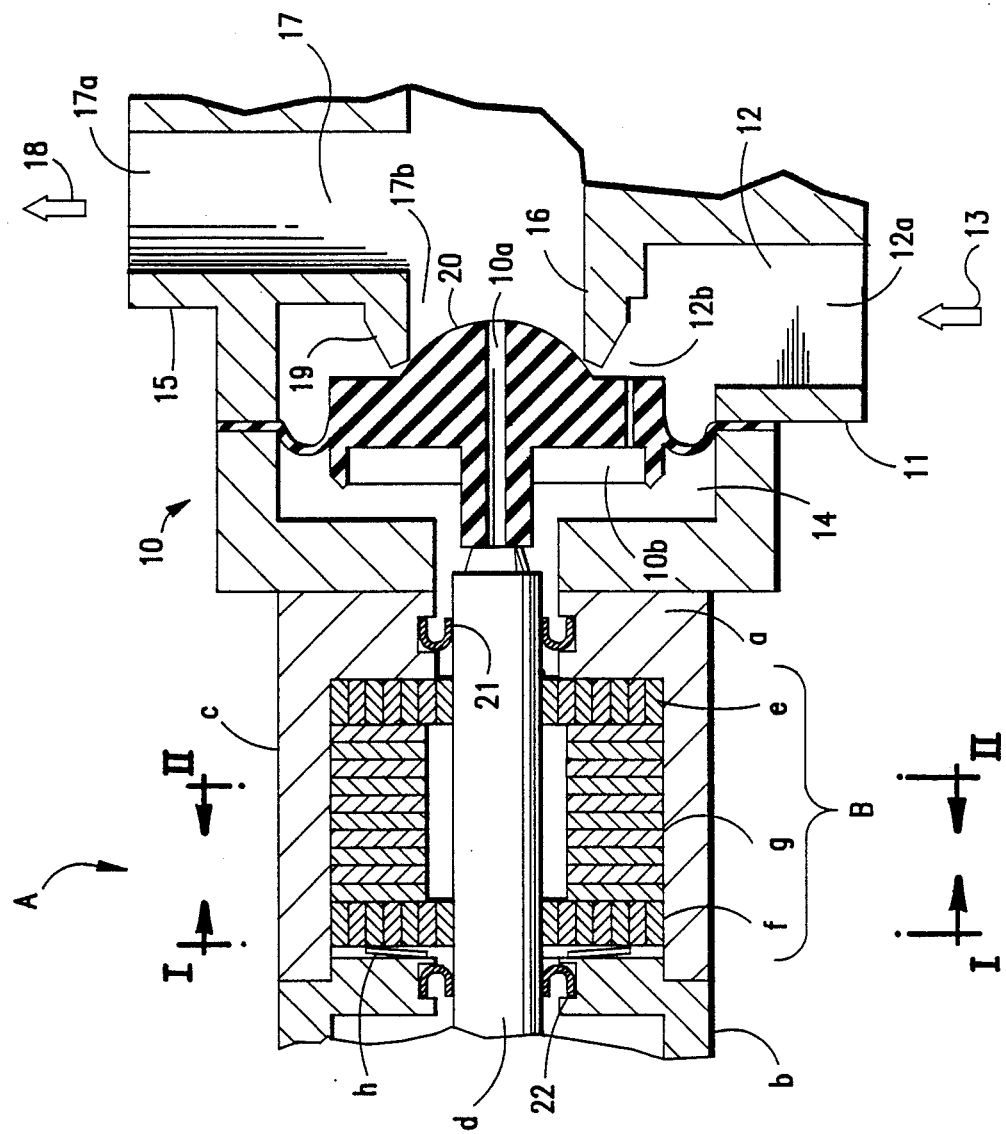
FIG. 1 is a cross-sectional elevational view of the automatically operating valve for regulating water flow of the first embodiment of the present invention provided with a single-valve-body construction.

In FIG. 1, the automatic operating valve for regulating water flow having a single-valve-body construction is shown.

Numeral 10 indicates a box-like casing. The casing 10 is provided with a both-open-ended L-shaped sleeve 11 on one side wall thereof and such L-shaped sleeve 11 forms an L-shaped inflow passage 12 therein.

The inflow passage 12 has an outer opening 12a thereof communicating with a water supply tube 13, while the inflow passage 12 has an inner opening 12b thereof communicating with a diaphragm operating chamber 14.

On the other side wall of the casing 10, a both-open-ended L-shaped sleeve 15 is provided and such a sleeve 15 has an approximately symmetrical relationship with the above-mentioned L-shaped sleeve 11 by way of a partition wall 16. In the L-shaped sleeve 15, an outflow passage 17 is formed and the flow passage 17 has an outer opening 17a thereof communicating with a secondary pipe 18 while an inner opening 17b thereof communicating with the diaphragm operating chamber 14.

At the inner opening portion of the L-shaped sleeve 15, a valve seat 19 is formed and a valve body 20 in the form of a diaphragm is capable of coming into contact with the valve seat 19 for closing the inner opening 17b of the outflow passage 17 and is capable of moving away from the inner opening 17b of the outflow passage 17.

Namely, the valve body 20 is provided with a pilot opening 10a which makes the outflow passage 17 communicate with the diaphragm operating chamber 14 and a bleed opening 10b which makes the diaphragm operating chamber 14 communicate with the inflow passage 12.

On a portion of the casing 10 which is adjacent to the diaphragm operating chamber 14, a piezoelectric actuator A is mounted.

The piezoelectric actuator A, as shown in FIG. 1, comprises a cylindrical actuator casing c which is provided with a front wall a and a rear wall b, a plunger d which is concentrically and axially reciprocably disposed in the actuator casing c, and three piezoelectric elements e,f,g which are concentrically and coaxially disposed around the outer periphery of the plunger d.

In the above construction, the plunger d has the distal end thereof retractably in contact with the rear surface of the valve body 20 and the three piezoelectric elements e,f,g constitute a piezoelectric element assembly B.

These piezoelectric elements e,f,g are constructed in such a way that they shrink when a pulse-like voltage is applied.

Namely, a pair of clamping piezoelectric elements e,f shrinks when the pulse-like voltage is applied and clamps the plunger d, while when the voltage is not applied, the clamping of the plunger d is released.

The stroke piezoelectric element g is in an extended condition along the plunger d when the pulse-like voltage is not applied, while the element g shrinks and shortens the entire axial length thereof when the pulse-like voltage is applied.

The plunger d is reciprocated in an axial direction by controlling the sequence of applying voltage to respective piezoelectric elements e,f,g as described later in detail.

As shown in FIG. 1 and FIG. 2, the clamping piezoelectric elements e,f are produced by concentrically assembling or adhering a plurality of concentric sleeve-shaped thin piezoelectric pieces with adhesives around the plunger d, wherein each piezoelectric piece is provided with electrodes at the inner and outer sides thereof.

Due to this construction, when the pulse-like voltage is applied to each piezoelectric piece, the piece shrinks radially and eventually the clamping piezoelectric elements e,f made of such piezoelectric pieces also shrinks radially to clamp the plunger d.

As shown in FIG. 1 and FIG. 3, the stroke piezoelectric element g is produced by coaxially assembling or adhering a plurality of concentric ring-shaped thin piezoelectric pieces with adhesives around the plunger d, wherein each piezoelectric piece is provided with electrodes at the inner and outer peripheries thereof.

Due to this construction, when the pulse-like voltage is applied to the piezoelectric piece, the piece shrinks axially along the plunger and the piezoelectric elements e,f made of such piezoelectric pieces also shrink axially.

The piezoelectric piece may preferably be a piezoelectric ceramics which is made of ferroelectric material of $ABO_3$ perovskite-type crystal structure such as $PZT[Pb(Zr,Ti)O_3]$, $PLZT[Pb,La(Zr,Ti)O_3]$ and other three composition systems basically comprising PZT.

In FIG. 1, h indicates a resilient member such as a conical disc spring which is used for biasingly urging the piezoelectric elements e,f,g toward the front wall a in order to form the piezoelectric elements e,f,g into an integral assembly.

Although the piezoelectric elements e,f,g have a circular shape, they may be formed in a rectangular shape or may be made of a plurality of sectors as shown in FIG. 4 and FIG. 5.

In FIG. 1, numerals 21,22 indicate packings having a U-shaped cross section or Y-shaped cross section for improving the water tightness of the piezoelectric actuator A.

Since the plunger d is clamped by the piezoelectric elements e,f,g frequently and is subject to heavy wear, the plunger d is preferably made of a bar which has low linear thermal expansion ratio, high hardness, high modulus of elasticity, high anti-creep property, high abrasion resistance and high machining property. A bar made of ceramic may be used as the plunger d.

Figure 6:
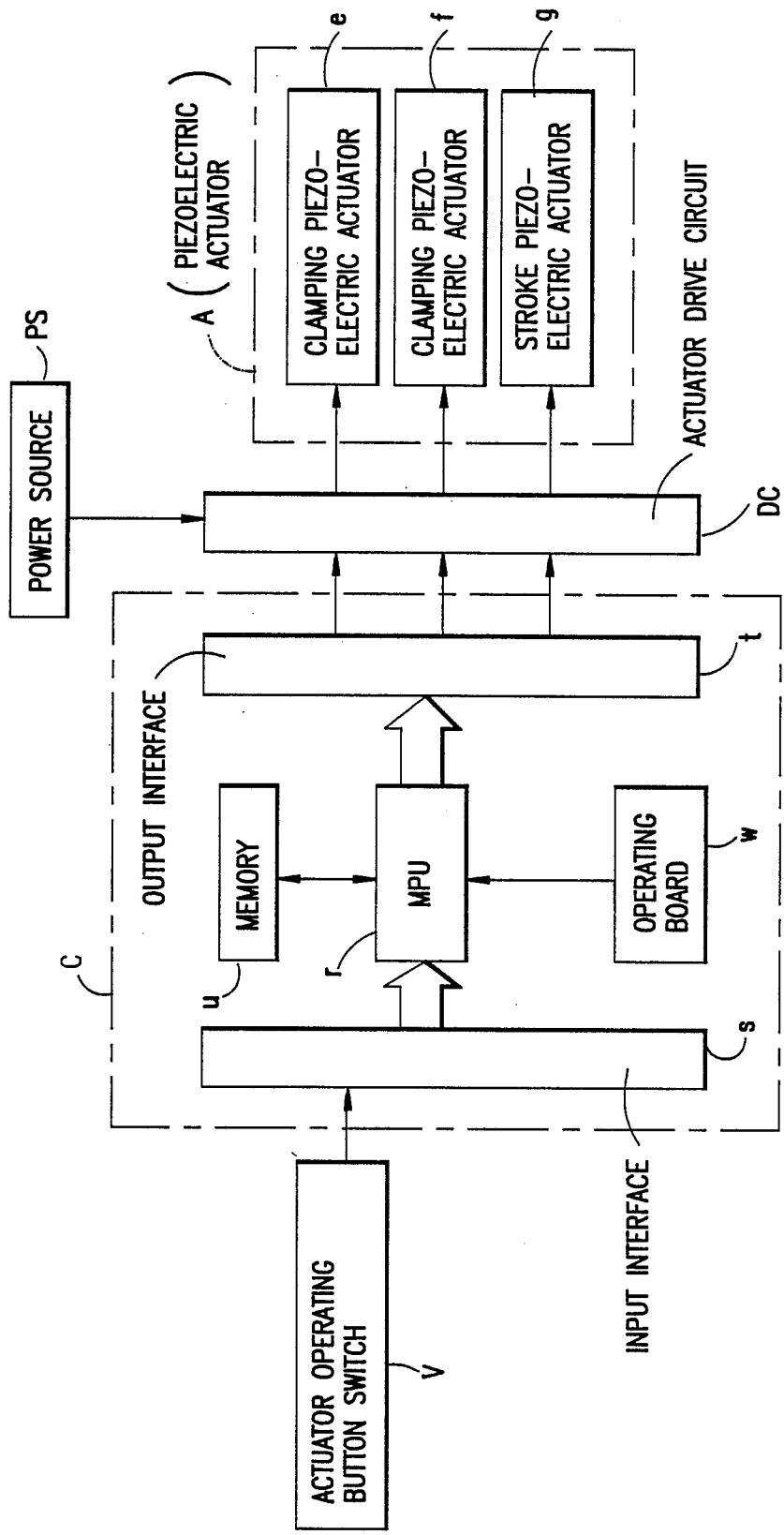
FIG. 6 is a block diagram of the control device applicable to the valve of this embodiment.

In FIG. 6, a control device C for controlling the operation of the piezoelectric actuator A is shown. The control device C comprises a microprocessor r, an input interface s, an output interface t, and a memory u which stores programs for driving the clamping piezoelectric elements e,f and the stroke piezoelectric element g.

To the input interface s, an actuator operating button switch v is connected by way of a drive circuit DC, while to the output interface t, the piezoelectric actuator A is connected.

Voltage for activating the piezoelectric elements e,f,g of the piezoelectric actuator A is supplied to the elements e,f,g from a power source PS by way of the drive circuit DC.

The manner in which the above-mentioned automatic operating valve for regulating water flow is operated is hereinafter explained in conjunction with FIG. 7 through FIG. 10.

When the operator pushes the actuator operating button switch v of FIG. 6 which may be mounted on an operating or control board w, an output signal is transmitted to the control device C. Following this output signal, the control device C reads out the program for driving the clamping piezoelectric elements e,f and the stroke piezoelectric element g from the memory u and applies a pulse-like voltage to the piezoelectric elements e,f,g through the drive circuit DC following the above program.

Figure 7:
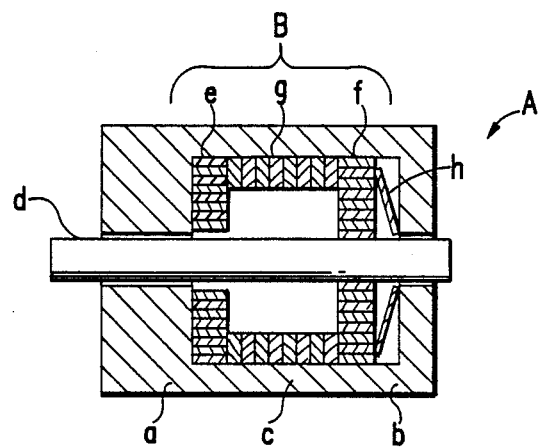
FIG. 7 through FIG. 9 are explanatory views showing the manner of operation of the piezoelectric actuator.

Namely, as shown in FIG. 7, in the first step, the pulse-like voltage is not yet applied to the clamping piezoelectric element f so that the plunger d is held in a clamped condition, while the pulse-like voltage is applied to the clamping piezoelectric element e so that the element e shrinks and the plunger d is released from the clamped condition.

Figure 8:
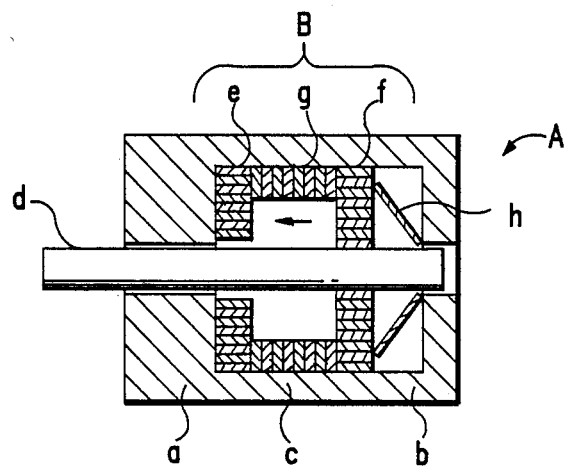

Subsequently, as shown in FIG. 8, the pulse-like voltage is applied to the stroke piezoelectric element g so that the element g shrinks a distance which corresponds to the magnitude of voltage of the pulse given to the element g and the plunger d which is clamped by the clamping piezoelectric element f is also moved the same distance in the same direction as the element g.

Figure 9:
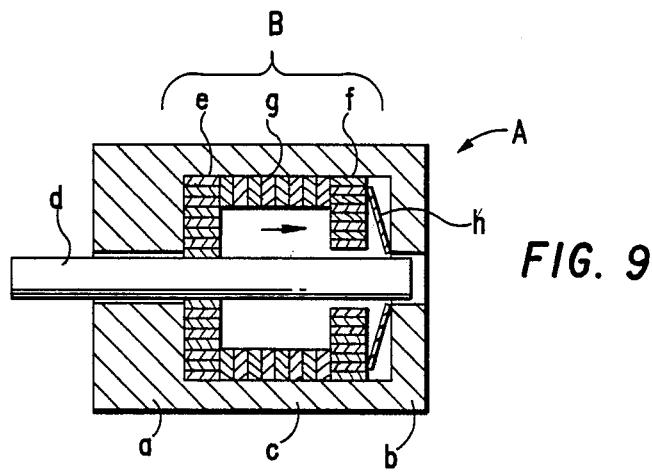

Then, as shown in FIG. 9, the pulse-like voltage is applied to the clamping piezoelectric element f and the element f shrinks to release the clamping force from the plunger d and the pulse-like voltage which has been applied to the stroke piezoelectric element g is terminated so that the element g elongates in the direction of the arrow and the clamping piezoelectric element f also moves in the same direction.

Figure 10:
FIG. 10 is a time chart showing the voltage application manner to respective piezoelectric elements.
Figure 10:
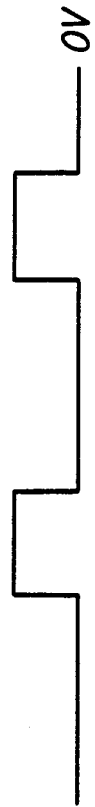
Figure 10:
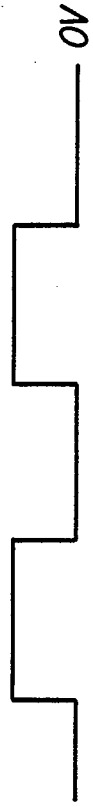

FIG. 10 shows the manner of applying voltage to respective piezoelectric elements e,f,g.

The above operational steps are automatically repeated to make the plunger d move like an inchworm in an order of $\mu m$/stroke in either a forward direction or a backward direction. Accordingly, the opening rate or angle of the valve body 20 can be finely adjusted so that the water flow can be accurately regulated.

Namely, in the above operation, since the movement of the valve body 20 is carried out by applying a pulse-like voltage to the clamping and stroke piezoelectric elements e,f,g each of which is made of a plurality of the piezoelectric plates and the movement of the plunger d per pulse is so minute, the movement of the valve body 20, namely the valve opening rate or angle of the valve can be finely regulated so that the flow rate also can be finely regulated.

As described above, the automatic operating valve for regulating water flow of this embodiment having a single-valve-body construction has the following advantages.

1. Since the valve body 20 is moved by the piezoelectric actuator A, the valve body 20 can be moved forward or backward in the order of $\mu m$/stroke corresponding to the magnitude of pulse-like voltage so that the valve can finely regulate the water flow.

2. Since the valve body 20 is moved finely by the piezoelectric actuator A, a speed reduction device which is inevitable with the conventional valve operated by the power-operated motor becomes unnecessary so that the valve becomes compact.

3. Since the valve body 20 is in the form of a diaphragm, the drive force necessary for moving the plunger d to actuate the valve body 20 can be minimized resulting in the considerable saving of electricity.

4. Since the valve body 20 is moved linearly by the piezoelectric actuator A, a rotary movement-linear movement converting mechanism which is inevitable with the conventional valve operated by the power-operated motor becomes unnecessary so that the valve becomes compact in this respect.

Figure 11:
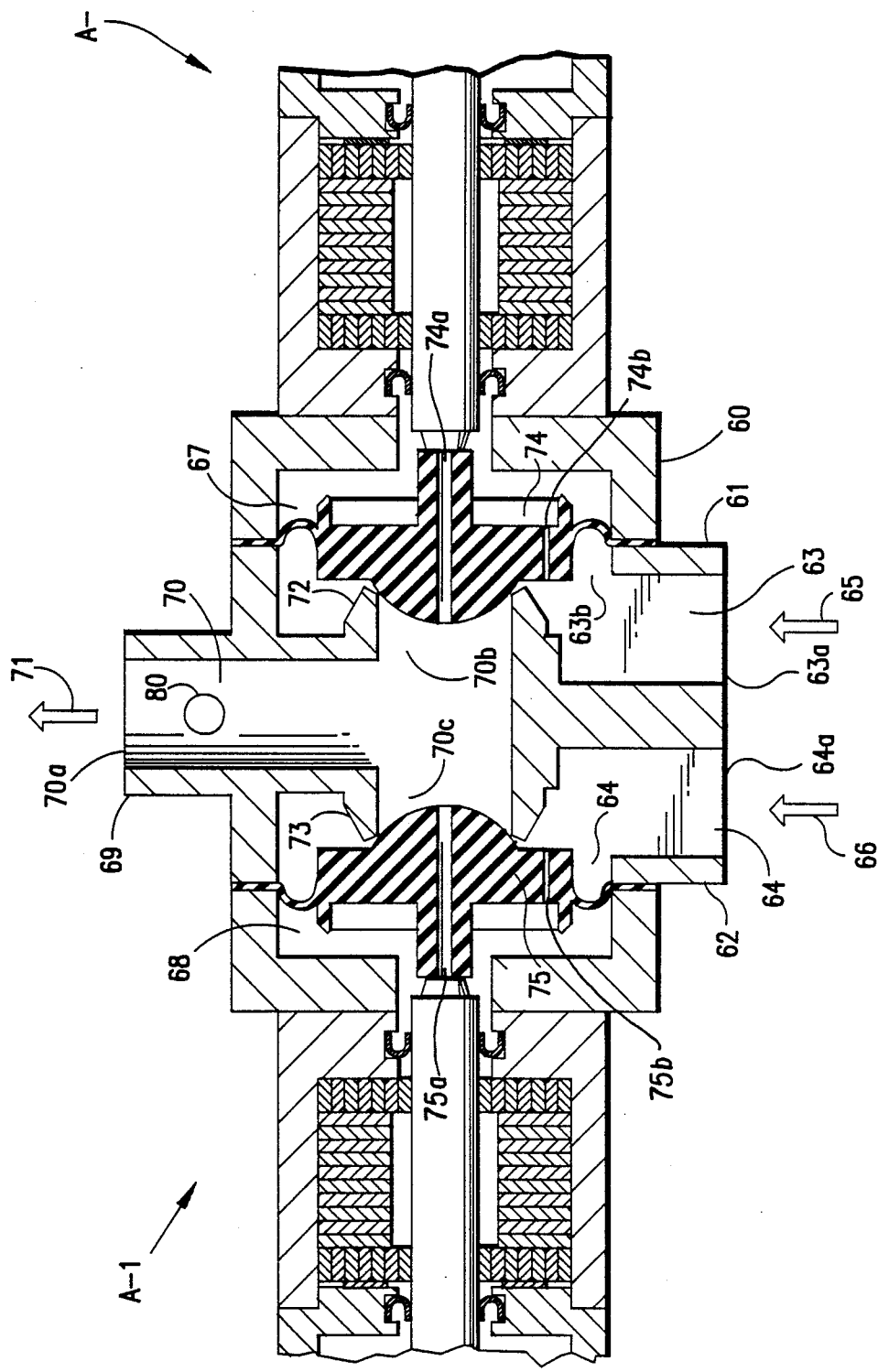
FIG. 11 is a cross-sectional elevational view of the automatically operating valve for regulating water flow of the first embodiment of the present invention provided with a double-valve-body construction.
Figure 12:
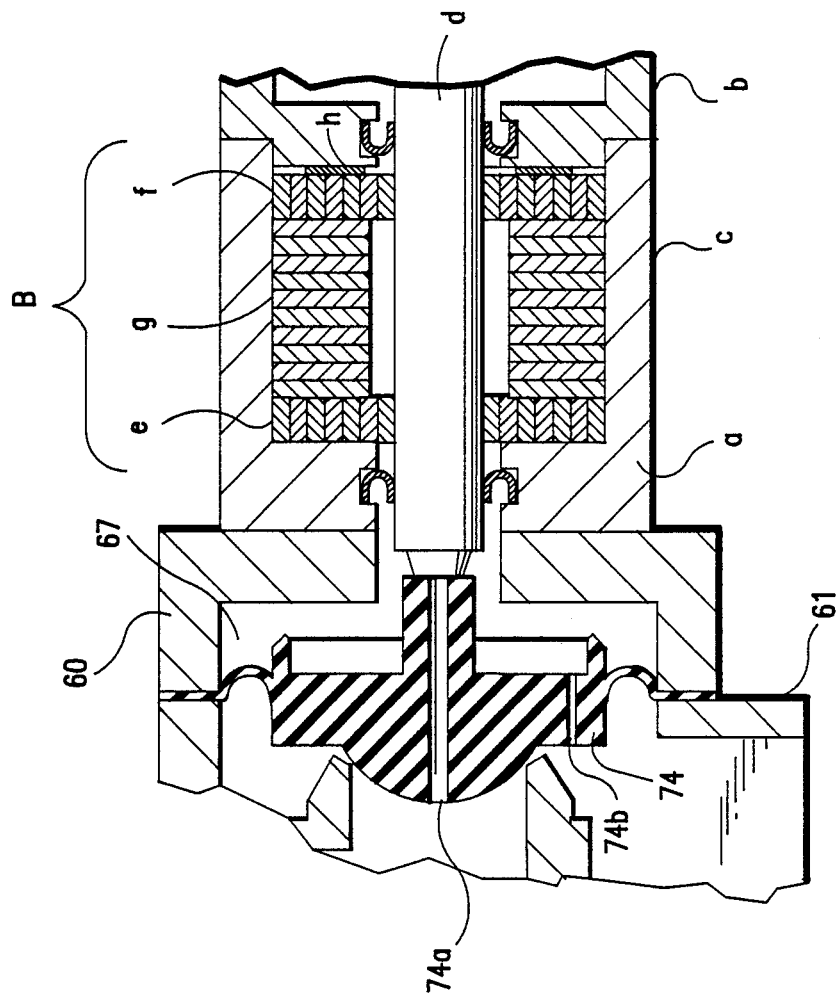
FIG. 12 is an enlarged partial view of the above-mentioned valve.

In FIG. 11 and FIG. 12, the automatic operating valve for regulating water flow having a single-valve-body construction is shown.

Numeral 60 indicates a cylindrical casing. The casing 60 is provided with a pair of both-open-ended sleeves 61,62 on one side wall thereof and such sleeves 61,62 form a pair of inflow passages 63,64 respectively.

The inflow passages 63,64 work as a cold-water passage and a hot-water passage in a mixing valve for obtaining water of a desired temperature respectively and such inflow passages 63,64 have outer openings 63a,64a thereof communicating with a cold-water supply tube 65 and a hot-water supply tube 66 respectively, while the inflow passages 63,64 have inner openings 63b, 64b thereof respectively communicating with diaphragm operating chambers 67,68 which are formed in both ends of the casing 60.

On the other side wall of the casing 60, a both-open-ended T-shaped sleeve 69 is provided and such sleeve 69 forms a T-shaped outflow passage 70 therein. Such an outflow passage 70 works as a mixed water passage in the mixing valve.

The outflow passage 70 has an outer opening 70a thereof communicating with a mixed water pipe 71 while inner openings 70b,70c thereof communicate with the diaphragm operating chambers 67,68.

At the inner bifurcated opening portions of the T-shaped sleeve 69, a pair of valve seats 72,73 are formed and a pair of valve bodies 74,75 each in the form of a diaphragm are capable of coming into contact with the valve seats 72,73 for closing the inner openings 70b,70c and capable of retracting away from the valve seats 72,73 for opening the inner openings 70b,70c of the outflow passage 70.

Namely, the valve bodies 74,75 are provided with a pair of pilot openings 74a,75a which make the outflow passage 70 communicate with the diaphragm operating chambers 67,68 and a pair of bleed openings 74b,75b which make the diaphragm operating chambers 67,68 communicate with the inflow passages 63,64.

At both ends of the casing 60, a pair of piezoelectric actuators A-1,A-1 are mounted respectively.

The piezoelectric actuator A-1, as shown in FIG. 11, has approximately the same construction as the piezoelectric actuator A which has been explained in connection with the automatic operating valve for regulating water flow which is shown in FIG. 1.

Figure 13:
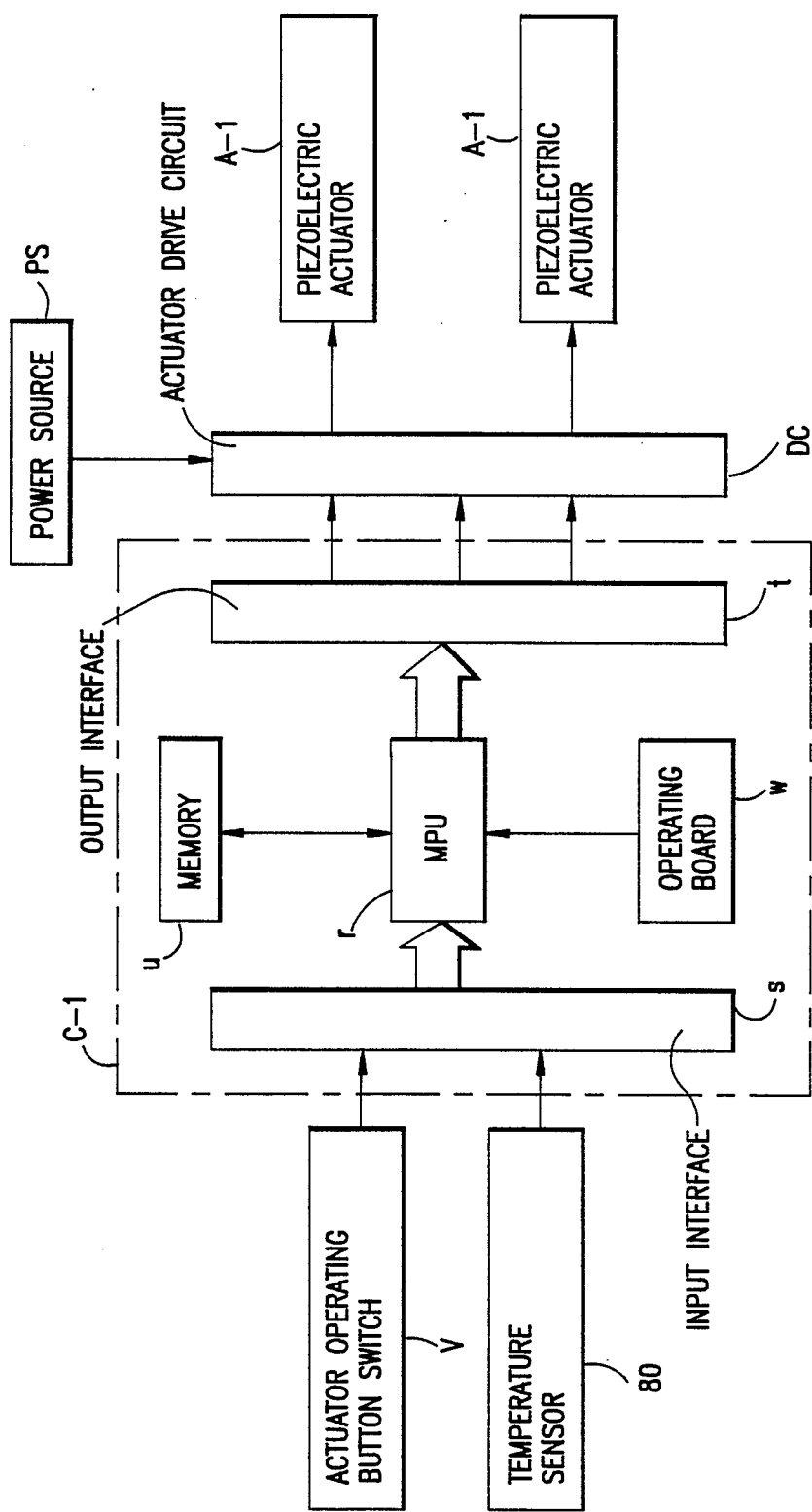
FIG. 13 is a block diagram of the control device applicable to the valve of the double-valve-body construction.

In FIG. 13, a control device C-1 for controlling the operation of the piezoelectric actuator A-1,A-1 is shown. The control device C-1 substantially has the same construction as that of the control device C for controlling the operation of the piezoelectric actuator A of the single-valve-body valve of FIG. 1 with the exception of the following constructions.

Namely, to the input interface s, a temperature sensor 80 is connected besides the actuator operation button v, while to the output interface t, a pair of the piezoelectric actuators A-1,A-1 which can be used as actuators for regulating the cold-water flow and the hot-water flow respectively are connected.

Figure 14:
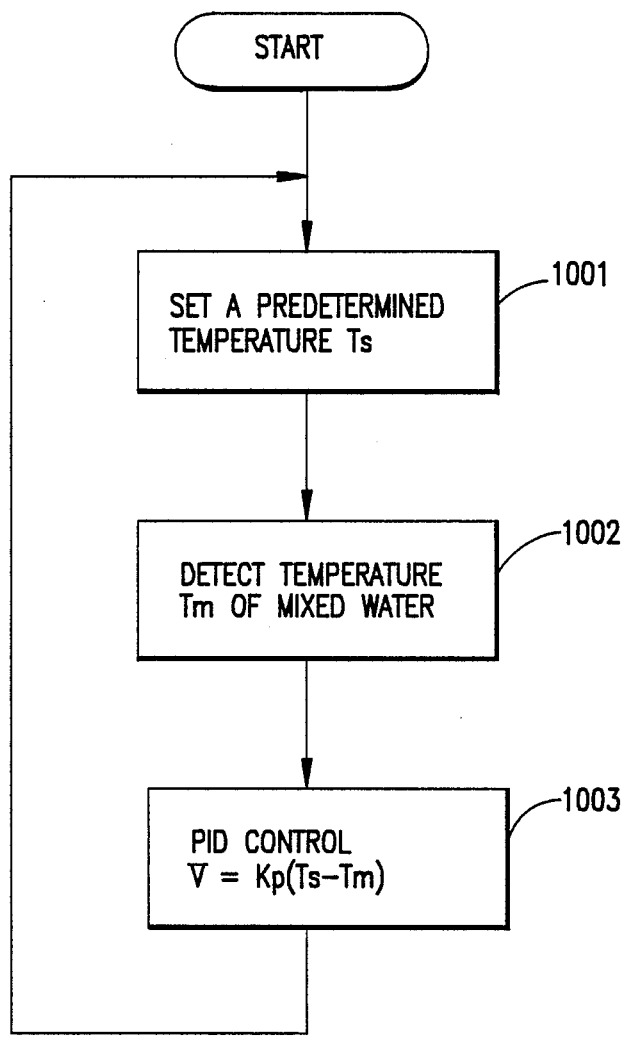
FIG. 14 is a flow chart showing the substantial operational sequence of the above-mentioned valve used as the mixing valve for mixing hot water with cold water.

The manner in which the above-mentioned automatic operating valve for regulating water flow is operated to obtain the mixed water of a desired temperature is hereinafter explained in conjunction with a flow chart shown in FIG. 14.

As the first operational step, the target temperature valve Ts is predetermined by manipulating a temperature set button on the operating or control board w (1001).

The temperature sensor 80 detects the temperature value Tm of the mixed water which is produced at the outflow side of the automatically operating valve (1002) and transmits detected temperature value Tm to the control device C-1.

The control device C-1 carries out the PID control based on the deviation $\Delta t$ between the temperatures Ts and Tm (1003) and transmits operating signals to the driver of the piezoelectric actuators A-1,A-1 which are used for regulating the cold-water flow and the hot-water flow respectively.

Accordingly, the valve bodies 74,75 are opened or closed independently and the hot-water flow and the cold-water flow are mixed at a desired mixing ratio.

In the above operation, since the valve bodies 74,75 are operated by the piezoelectric actuators A-1,A-1, the pulse-like voltage is applied to piezoelectric elements e,f,g in sequence following the operational steps explained in view of FIG. 7 through FIG. 9, thus the mixing ratio of the hot-water and the cold-water is finely or accurately adjusted to obtain the mixed water of a desired temperature.

Although, in the above embodiment, the automatically operating valve for regulating water flow is explained as the mixing valve for mixing the cold-water and the hot-water, the automatically operating valve for regulating water flow is applicable to other technical fields such as a water flow direction control valve for changing the direction of water flow from one direction to the other direction by providing a single inflow passage at one end of the casing and a plurality of outflow passages at the other end of the casing.

As has been described above, the automatically operating valve for regulating water flow of this embodiment having a double-valve-body construction has the following advantages.

1. Since the valve bodies 74,75 are moved by the piezoelectric actuators A-1,A-1, the valve bodies 74,75 can be moved forward or backward in the order of $\mu$m/stroke corresponding to the magnitude of the pulse-like voltage applied to the piezoelectric element g so that the valve can finely regulate the water flow.

2. Since the valve bodies 74,75 are moved finely by the piezoelectric actuators A-1,A-1, a speed reduction device which is inevitable with the conventional valve operated by the power-operated motor becomes unnecessary so that the valve becomes compact.

3. Since the valve bodies 74,75 are each in the form of a diaphragm, the driving force necessary for moving the plunger d to actuate the valve bodies 74,75 can be minimized resulting in the considerable saving of the electricity necessary for operating the piezoelectric actuators A-1,A-1.

4. Since the valve bodies 74,75 are moved linearly by the piezoelectric actuator A, a rotary movement-linear movement converting mechanism which is inevitable with the conventional valve operated by the power-operated motor becomes unnecessary so that the valve becomes compact in this respect.

Hereinafter, several preferred modifications of the above-mentioned automatically operating valve for regulating water flow are explained in view of the attached drawings FIG. 15 through FIG. 21.

Modification 1

Figure 15:
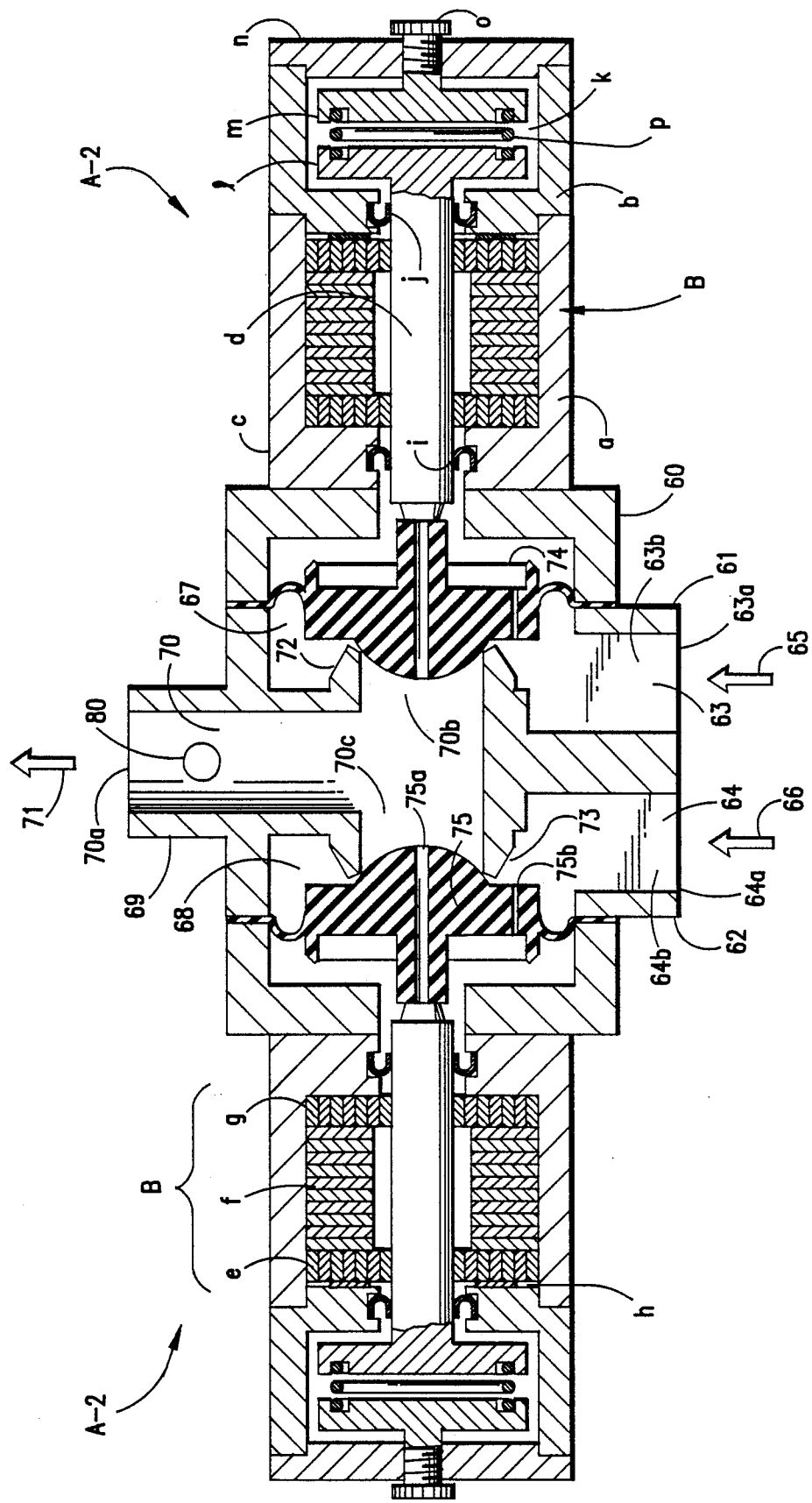
FIG. 15 is a cross-sectional elevational view of the first modification of the first embodiment of the automatically operating valve.

As shown in FIG. 15, the automatically operating valve for regulating water flow in this modification 1 substantially has the same construction as that of the automatically operating valve for regulating water flow of the above embodiment shown in FIG. 10 although the construction of the piezoelectric actuators is slightly different.

Namely, in FIG. 15, k indicates a spring storing chamber which is provided on the outer surface of the rear wall b of the actuator casing c and a pair of spring support plates 1,m are disposed in the chamber k and a compression spring p is sandwiched between spring support plates 1,m.

The spring support plate 1 is integrally connected with the plunger d, while the spring support plate m is connected with a threaded shaft o which is threaded into an auxiliary wall n attached to the rear wall b.

Due to this construction, when the plunger d is in an unclamped condition, the plunger d is moved to a standby position such as in a frontmost position to close the valve completely by the biasing force of the compression spring p.

The biasing force of the compression spring p can be readily adjusted by changing the gap between the spring support plates 1,m and such change of gap is carried out by manipulating the threaded shaft o.

The control device C-1 shown in FIG. 13 can be also used for controlling the operation of the automatically operating valve for regulating water flow in this modification 1.

The piezoelectric elements e,f of this modification, however, are actuated completely in an opposite manner compared to the piezoelectric elements e,f of the above-mentioned embodiment of FIG. 11.

Namely, the clamping piezoelectric elements e,f shrink when the pulse-like voltage is not applied so that the clamping force is not applied to the plunger d, while the clamping piezoelectric elements e,f extend when the pulse-like voltage is applied to clamp the plunger d.

Accordingly, when the pulse-like voltage is applied to neither clamping piezoelectric elements e,f, the clamping force to the plunger d is completely released so that the plunger d is moved to the frontmost position to close the valve completely by the biasing force of the compression spring p.

The manner in which the above-mentioned automatically operating valve for regulating water flow of this modification 1 is operated to obtain the mixed water of a desired temperature is hereinafter explained in conjunction with FIG. 15.

As in the case of the automatically operating valve for regulating water flow shown in FIG. 13, the temperature value Tm is fed back to the control device C-1 and the control device C-1 carries out the PID control based on the deviation $\Delta t$ between the temperature Ts and Tm and transmits operating signals to the driver of the piezoelectric actuators A-2,A-2 respectively which are used for regulating the cold-water flow and the hot-water flow.

Accordingly, the valve bodies 74,75 are opened or closed independently and the hot-water flow and the cold-water flow are mixed at a desired mixing ratio.

In the above operation, since the valve bodies 74,75 are operated by the piezoelectric actuators A-2,A-2, the pulse-like voltage is applied to the piezoelectric elements e,f,g in sequence following the operational steps explained in view of FIG. 7 through FIG. 9, thus the mixing ratio of the hot-water and the cold-water is finely or accurately adjusted to obtain the mixed water of a desired temperature.

Furthermore, even when the electricity is cut off by accident, the plunger d is unclamped so that it is moved to the frontmost position to close the valve completely by the biasing force of the compression spring p, whereby the waste of water which may be caused by a continuous outflow can be prevented.

Figure 16:
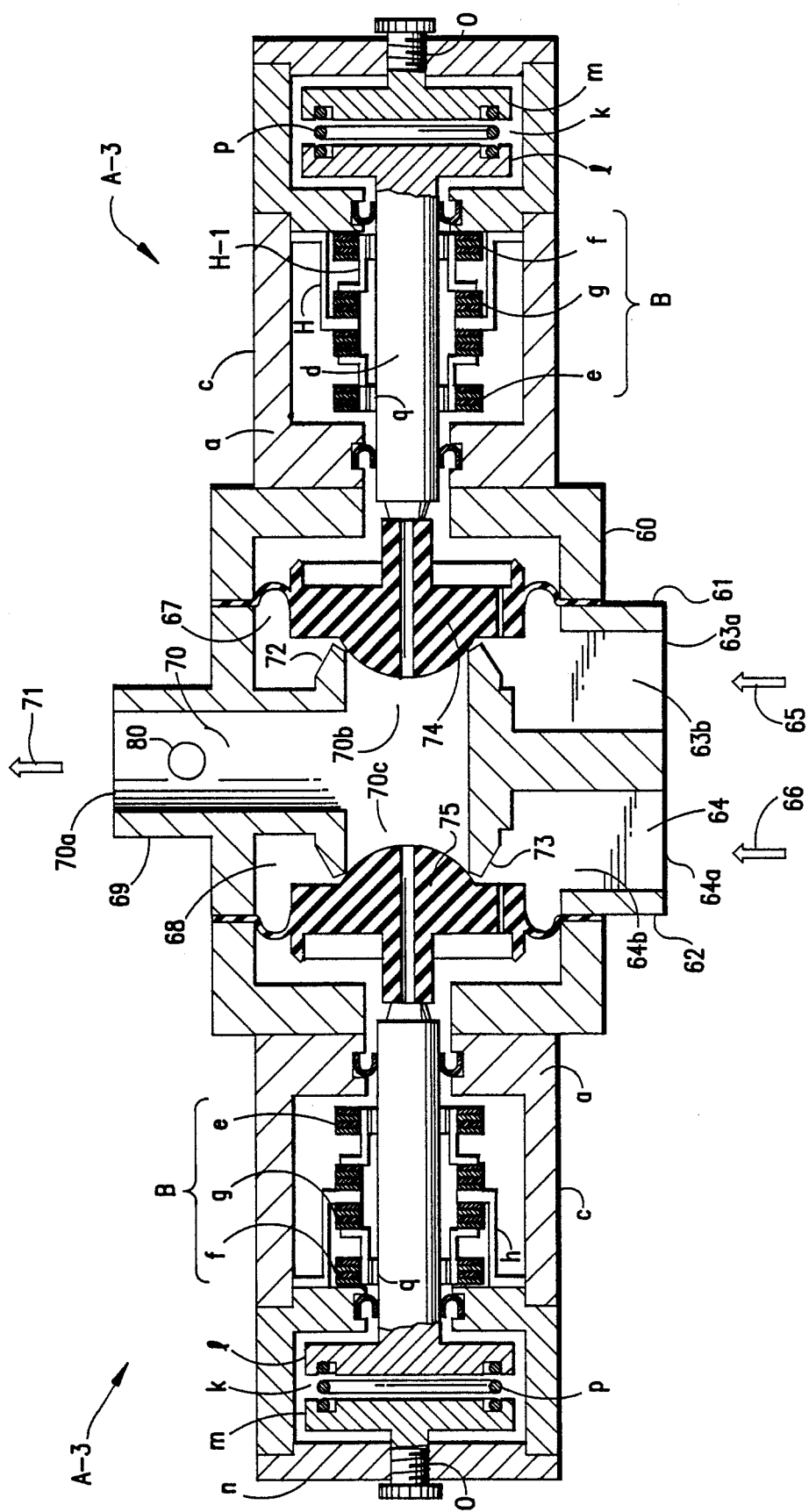
FIG. 16 is a cross-sectional elevational view of an improvement of the first modification of the first embodiment of the automatically operating valve.

In FIG. 16, an improvement on the automatically operating valve of this embodiment 1 is shown, wherein the construction of the piezoelectric actuators A-3,A-3 is improved.

In the drawing, the piezoelectric elements e,f,g which constitute the main parts of the piezoelectric actuator A-1,A-1 are arranged in the actuator casing c such that the stroke piezoelectric element g has the central portion thereof attached to the inner wall of the actuator casing c by means of a support bracket H and a pair of support arms H-1, H-1.

The proximal ends of the support arms H-1, H-1 are connected to both ends of the stroke piezoelectric element g and the clamping piezoelectric elements e,f have the proximal ends thereof connected to the distal ends of the support arms H-1, H-1.

In FIG. 16, q indicates brake shoes disposed between the distal ends of the support arms H-1,H-1 and the outer surface of the plunger d and such brake shoes q have sufficient friction and abrasion-resistance to clamp the plunger d when the pulse-like voltage is applied to the piezoelectric elements e,f.

Due to this construction, the improvement has the following additional advantages compared to the automatically operating valve for regulating water flow shown in FIG. 15.

1. Since the piezoelectric elements e,f,g are disposed in the actuator casing c by way of the support bracket H and the support arms H-1, direct contact between the piezoelectric elements e,f,g and the actuator casing c can be prevented. Accordingly, the piezoelectric elements e,f,g can deviate sufficiently so that the clamping force by the clamping piezoelectric elements e,f and the movable distance of the stroke piezoelectric element g can be greatly enhanced. Furthermore, since the direct application of the clamping force and the stroke force to the actuator casing c can be obviated, the actuator casing c can be made of light and thin material so that piezoelectric actuators A-3,A-3 can be compactly and lightly manufactured.

2. In this improvement, not only the stroke piezoelectric element g but also the clamping piezoelectric elements e,f are produced by adhering a plurality of concentric ring-shaped thin piezoelectric pieces with adhesives around the plunger d, wherein each piezoelectric piece is provided with electrodes at the inner and outer peripheries thereof. Accordingly, the adhering operation can be readily carried out resulting in the lowering of the manufacturing cost of the piezoelectric actuators A-3,A-3. Furthermore, the peeling-off of the piezoelectric pieces can be also prevented.

The clamping piezoelectric elements e,f shown in FIG. 2 generate hoop stress between the piezoelectric pieces so that the adhering strength of the adhering agent is deteriorated and the peeling off of the piezoelectric piece occurs.

Modification 2

Figure 17:
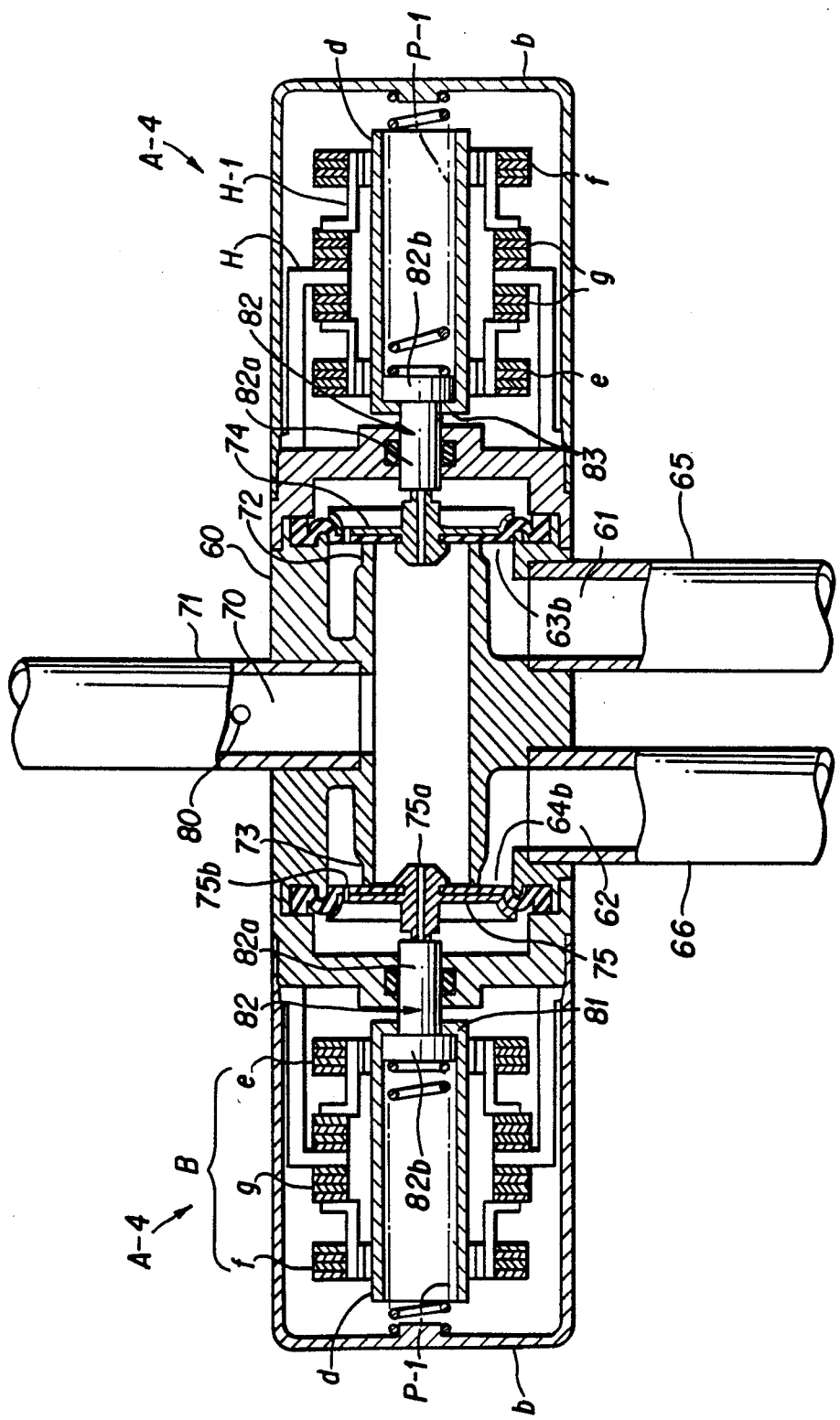
FIG. 17 is a cross-sectional elevational view of the automatically operating valve of the second modification of the first embodiment.

As shown in FIG. 17, the automatically operating valve for regulating water flow of this modification 2 substantially has the same construction as that of the automatically operating valve for regulating water flow of the above embodiment shown in FIG. 11 although the construction of the piezoelectric actuators A-4,A-4 is slightly different.

Namely, in this modification, the plunger d is made of a hollow cylindrical member and a plunger head 82, which is biased by a spring p-1, is disposed.

To be more specific, in the cylindrical actuator casing c which is provided with the front wall a and the rear wall b at both ends thereof, the cylindrical plunger d is concentrically disposed and the plunger d is axially and reciprocably movable in the casing c.

The plunger d has a circular wall 81 at the front end thereof and an opening 83, through which the plunger head 82 passes, is formed at the center of the circular wall 81.

The plunger head 82 consists of a small-diameter portion 82a and a large-diameter portion 82b, wherein the small-diameter portion 82a passes through the opening 82 and extends toward the valve bodies 74,75 and the large-diameter portion 82b is slidably disposed in the plunger d. The large-diameter portion 82b is capable of coming into contact with the circular wall 81 of the plunger d.

In the plunger d, the spring p-1 is disposed and such spring p-1 has both ends thereof supported by the end face of the large-diameter portion 82b of the plunger head d-1 and the rear wall b of the actuator casing c respectively.

Due to this construction, the plunger head 82 is constantly biased in a forward direction by the spring p-1 and the large-diameter portion 82b of the plunger head 82 biasingly comes into contact with the circular end wall 81 of the plunger d.

To explain the manner of operation of the plunger d which has the above construction, when the plunger d extends in a forward direction, the plunger head 82 which is biased to the circular wall 81 of the plunger d by the spring p-1 also moves the same distance in a forward direction.

On the other hand, when the plunger d is retracted, the circular wall 81 of the plunger d is engaged with the large-diameter portion 82b of the plunger head 82 so that the plunger head 82 is integrally retracted with the plunger d.

Furthermore, when the application of a pulse-like voltage to the piezoelectric elements e,f,g is terminated by accident such as when the electricity is cut off, the clamping force is released so that the plunger d and the plunger head 82 move together in a forward direction due to the biasing force of the spring p-1,p-1.

Accordingly, the valve bodies 74,75 come into contact with the valve seat 72,73 so that the valve can completely close the flow of the hot water and the cold water, whereby the waste of water which may be caused by the continuous out flow can be prevented.

Still furthermore, even when the plunger d further extends in a forward direction after the pluger heads 82,82 come into contact with the valve bodies 74,75 along with the forward movement of the plunger d which is caused by the actuation of the piezoelectric elements e,f,g, the valve bodies 74,75 receive only the biasing force of the spring p-1,p-1, which is far smaller than the thrust force generated by the actuation of the stroke piezoelectric element g. Accordingly, the damage on the valve bodies 74,75 by such a thrust force can be prevented effectively.

Modification 3

Figure 18:
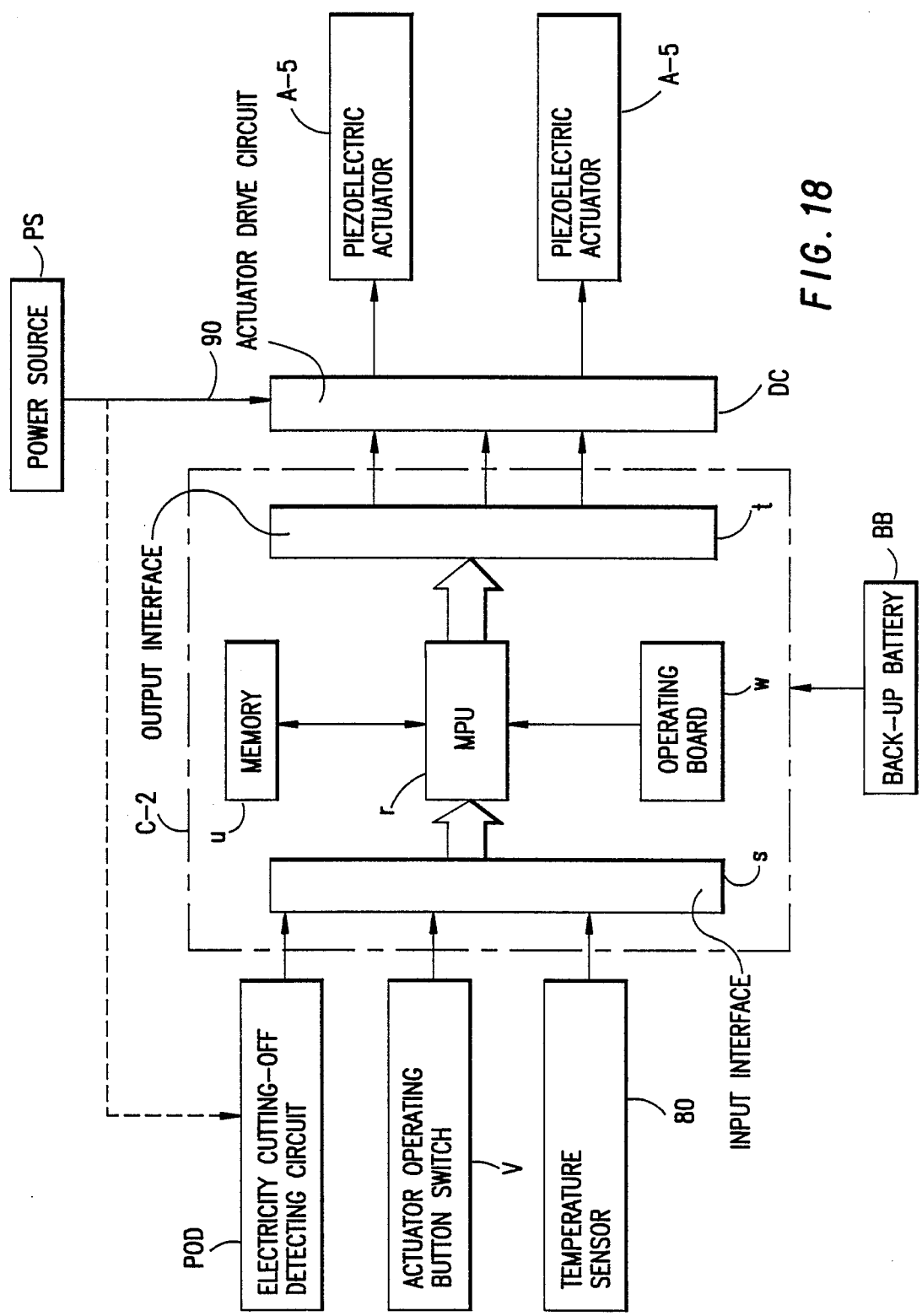
FIG. 18 is a block diagram of the control device applicable to the third modification of the valve.

As shown in FIG. 18, this modification is characterized in that a control device C-2 for controlling the operation of a pair of piezoelectric actuators A-5,A-5 is provided with a circuit POD for detecting the cutting off of the electricity supplied to the drive circuit DC connected to the piezoelectric actuators A-5,A-5 so that the piezoelectric actuators A-5,A-5 can be reliably actuated or operated even in case of the power failure.

The control device C-2 substantially has the same construction as that of the control device C-1 for controlling the operation of the piezoelectric actuators A-1,A-1 of the double valve-body valve of FIG. 10 with the exception of the following constructions.

Namely, in the control device C-2, the circuit POD for detecting the disconnection or the cutting off of the electricity is interposed between a power supply circuit 90 and the interface s of the microprocessing unit r. Furthermore, the control device C-2 includes a back up battery BB (a back up condensor also being employable) which supplies electricity to the control device C-2 and the drive circuit DC. The circuit POD and the battery BB are operated when the electricity from the power source PS is disconnected and make the microprocessing unit r and the drive circuit DS operate as programmed until the valve is completely closed.

Figure 18A:
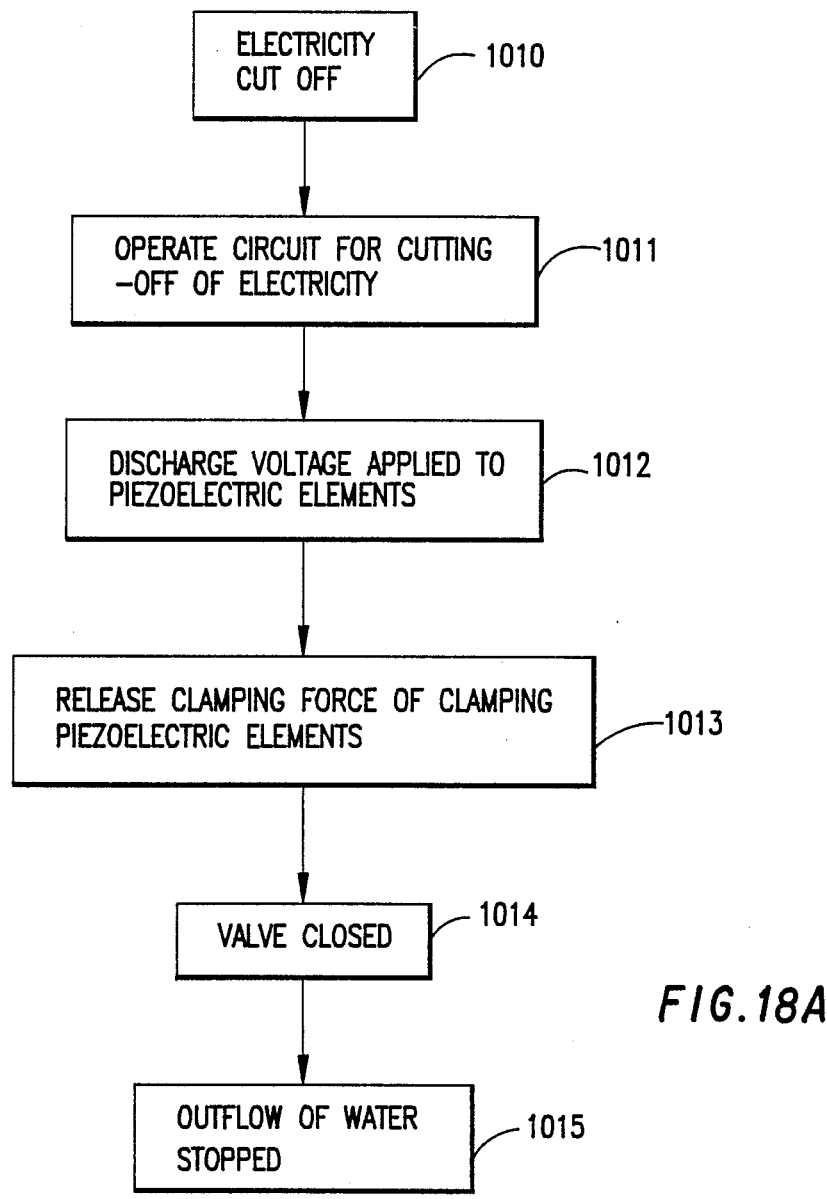
FIG. 18A is a flow chart showing the operational sequence for detecting the cutting off or disconnection of electricity.

To explain in more detail in view of the flow chart of FIG. 18A, when the electricity is cut off (1010), the circuit POD and the battery BB are operated (1011) to make the piezoelectric drive circuit DC operate to discharge the voltage being applied to the piezoelectric elements e,f,g (1012). Accordingly, the clamping force of the piezoelectric elements e,f,g is released (1013) and the plunger d is moved in a valve-closing direction, for example, by means of a spring to close the valve (1014) and the outflow of water is stopped (1015).

In the above modification, the clamping piezoelectric elements e,f are designed to clamp the plunger d when the pulse-like voltage is applied to the elements e,f. The above-mentioned circuit POD is also applicable to the piezoelectric actuators A-5,A-5 which are respectively provided with the clamping piezoelectric elements e,f which are designed to clamp the plunger d when the pulse-like voltage is not applied to the elements e,f.

Figure 19:
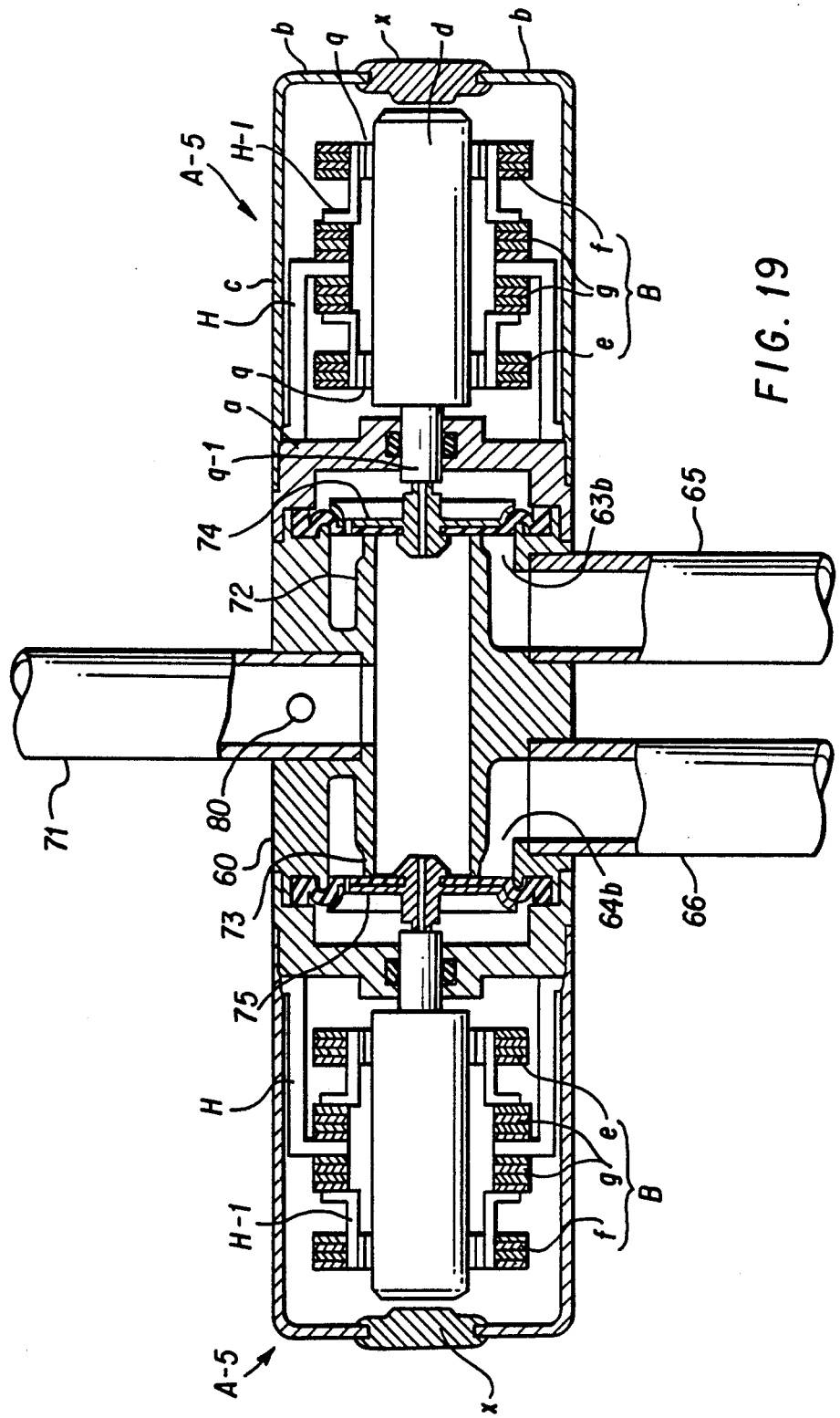
FIG. 19 is a cross-sectional elevational view of the third and fourth modifications of the first embodiment of the automatically operating valve.

In FIG. 19, the automatically operating valve for regulating water flow of this modification 3 which is provided with such piezoelectric actuators A-5,A-5 is disclosed and such valve substantially has the same construction as that of the automatically operating valve for regulating water flow of the above embodiment shown in FIG. 11 although the construction of the piezoelectric actuators A-5,A-5 is slightly different.

Namely, as shown in FIG. 19, each piezoelectric actuator A-5 is provided with a manual plunger forwarding means x which is illustrated as a resilient manual plunger forwarding button mounted on the central portion of the rear wall b.

When the manual plunger forwarding means x is pressed by a finger, the plunger forwarding means x protrudes toward the plunger d and urgingly comes into contact with the rear end surface of the plunger d and moves the plunger d in a forward direction against the clamping force which is applied on the plunger d by the clamping piezoelectric elements e,f.

Accordingly, in case the automatically operating valve for regulating water flow is stopped with the valve being open due to any accident such as the cutting off of electricity, the valve can be completely closed by pressing the manual plunger forwarding means x.

Figure 20:
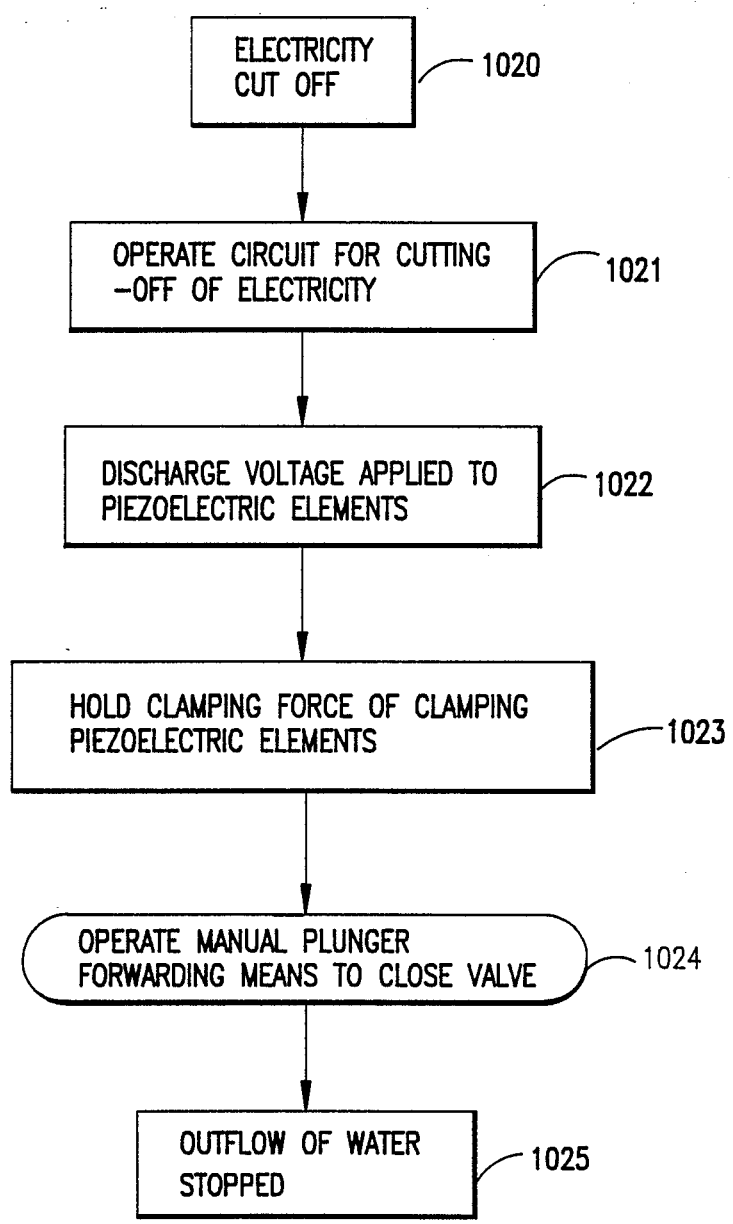
FIG. 20 is a flow chart showing another operational sequence for detecting the cutting off or disconnection of electricity.

To explain the manner of operation of the valve in view of the flow chart shown in FIG. 20, when the electricity is cut off (1020), the circuit POD is operated (1021) to make the piezoelectric drive circuit DC operate to discharge the voltage being applied to the piezoelectric elements e,f,g (1022). Accordingly, the piezoelectric elements e,f,g are turned off and the clamping piezoelectric elements e,f clamp the plunger d (1023). Subsequently, the valve can be completely closed by pressing the manual plunger forwarding means x (1024) (1025). In the above operation, the circuit POD and the drive circuit DC are also operated by the back-up battery BB.

The mounting of the plunger d to the piezoelectric actuators A-4,A-4 is carried out while the clamping piezoelectric elements e,f are being applied with pulse-like voltage.

Modification 4

This modification is, as shown in FIG. 19, characterized in that the plunger d is provided with a small-diameter portion q-1 at the distal end thereof so that the end surface area of the plunger d which is subject to water pressure can be made as small as possible.

Due to this construction, throughout the actuation of the piezoelectric actuators A-5,A-5 of the automatically operating valve for regulating water flow, the thrust force that the plunger d receives from the water which is to be regulated can be minimized. Namely, the thrust force (water pressure) which ill-affects the movement of the plunger d can be minimized so that the movement of the piezoelectric actuators is accurately transmitted to the plunger d resulting in the accurate control of the movement of the valve bodies 74,75.

Modification 5

This modification is characterized in that a water stoppage mode is added to the mode of operation of the automatically operating valve for regulating water flow described in the modification 2.

Figure 21:
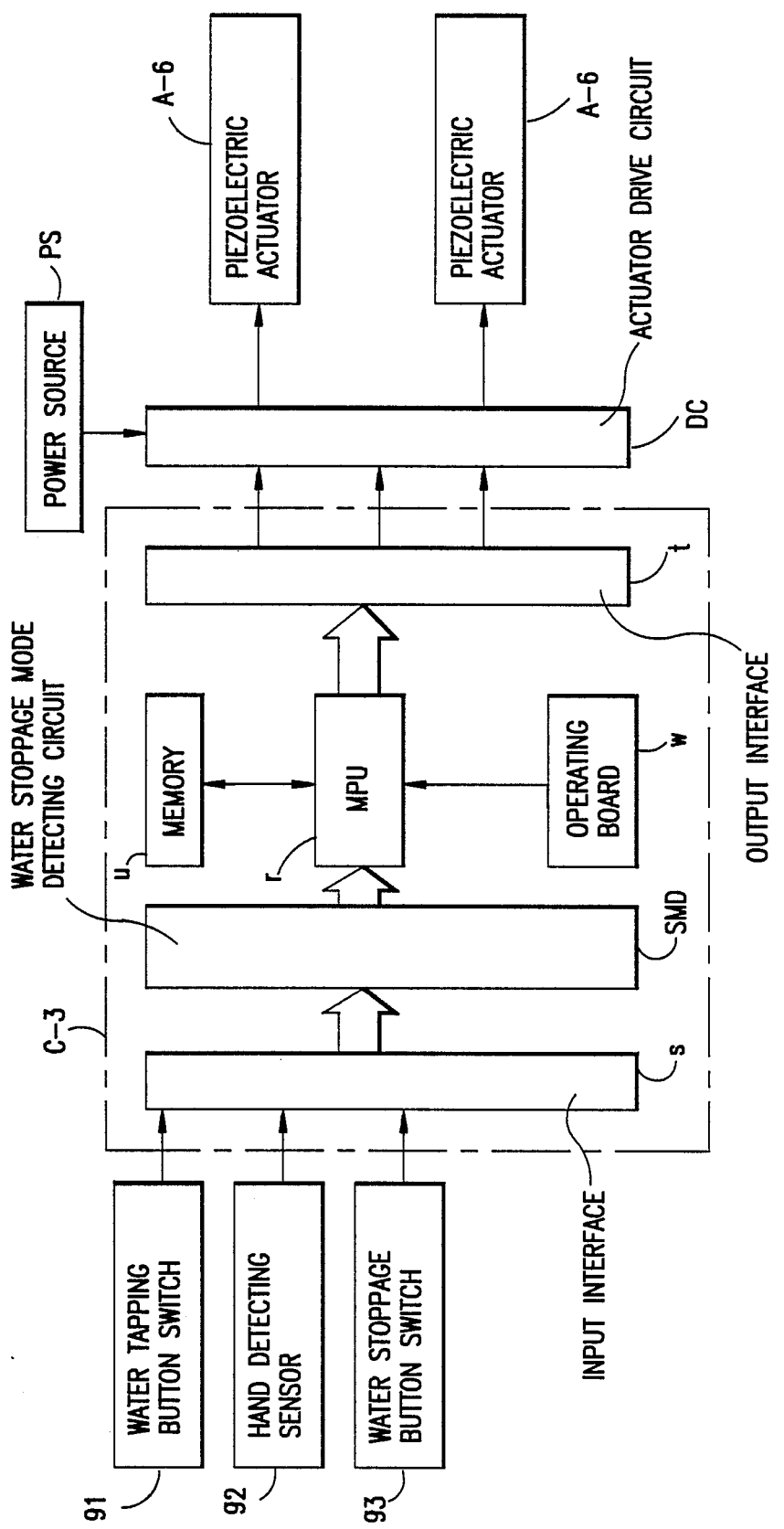
FIG. 21 is a block diagram of the control device provided with a water stoppage function and applicable to the fifth modification of the first embodiment of the automatically operating valve.

Namely, as shown in FIG. 21, the control device C-3 applicable to the automatically operating valve for regulating water flow of this modification 5 includes a water stoppage mode detecting circuit SMD and a water tapping button switch 91, a hand detecting sensor 92 and a water stoppage button switch 93 are connected to the interface s of the control device C-3.

Due to this construction when the water tapping button switch 91 is pushed, the control device C-3 makes the power source or the drive circuit transmit the pulse-like voltage to the piezoelectric actuators A-6,A-6 to open the valve, wherein so long as the tapping button switch 91 is continuously held in a pushed condition, the pulse-like voltage is continuously applied to the piezoelectric actuators A-6,A-6 and when the tapping button switch 91 is turned off, the supply of the pulse-like voltage to the piezoelectric actuators A-6,A-6 is ceased.

Accordingly, the amount of water tapped can be regulated by setting a time for holding the tapping button switch 91 in an ON position.

Simultaneously, when the hand detecting sensor 92 detects the hand, a predetermined amount of water is tapped.

On the other hand, when the detecting of the hand by the hand detecting sensor 92 is terminated or a predetermined time lapses after pressing the water tapping button switch 91 on, the water stoppage mode detecting circuit SMD in the control device C-3 detects the water stoppage mode and makes the control device C-3 generate signals to release a voltage applied to respective piezoelectric elements e,f,g. Accordingly, the clamping force applied to the plunger d is released and the plunger d automatically moves in a direction to close the valve by the biasing force of the spring p-1.

As described above, in this modification 5, since the valve closing operation is carried out by means of the spring p-1, the position where the water is completely stopped can be determined irrespective of the operating condition of the control device C-3 so that if the valve operating sequence is programmed with the above water stopping position as origin, the operating position of the plunger d which corresponds to the number of drive pulses counted by the control device C-3 can be calibrated at each complete water stopping operation.

Accordingly, after the water stopping operation, the movement of the plunger d can be accurately controlled by the control device C-3 again.

Namely, after the calibration or the water stopping operation, when the pulse-like voltage of desired pulse number which is proportional to the opening rate of the valve is applied to the piezoelectric elements e,f,g, the valve body 20 is readily and accurately moved to a predetermined open-valve position to carry out the temperature control of the mixed water.

According to this modification, the valve body 20 is constantly biasingly forced toward the water stopping position and the valve body 20 moves and closes the valve seat 19 completely when the clamping force is released.

Therefore, the modification can have the following advantages.

1. The actuator is constructed or controlled such that when the drive voltage is not applied to the actuators from the drive device, the clamping of the plunger d or the valve body 20 is released. Therefore, the automatically operating valve for regulating water flow can be closed by stopping the applying of the voltage to the piezoelectric actuator irrespective of the position of the valve bodies and diaphragm.

2. Since the force applied to the valve seats 72,73 of the valve bodies 74,75 would not exceed the resilient or biasing force of the spring p-1, the application of an excessive force or stress on the valve bodies 74,75, valve seats 72,73 or diaphragm can be effectively obviated thus preventing the occurrence of damage to these parts.

3. Since the complete water stopping position is determined mechanically by the biasing force of the spring p-1, a sensor to detect that the valve bodies have reached the complete water stopping position becomes unnecessary and the valve contol sequence program can be simplified.

4. Since the water stopping position to completely stop the water flow is determined mechanically by the biasing force of the spring p-1, the complete water stopping position can be set as an origin and the position of the valve bodies computed by the control device C-3 can be calibrated at each water stopping operation. Accordingly, the positional errors which are accumulated during the actuation of the piezoelectric elements e,f,g can be calibrated or cancelled so that the position of the valve bodies can be accurately controlled.

Second Embodiment

This embodiment relates to a faucet F provided with the automatically operating valve for regulating water flow described in the first embodiment.

Figure 22:
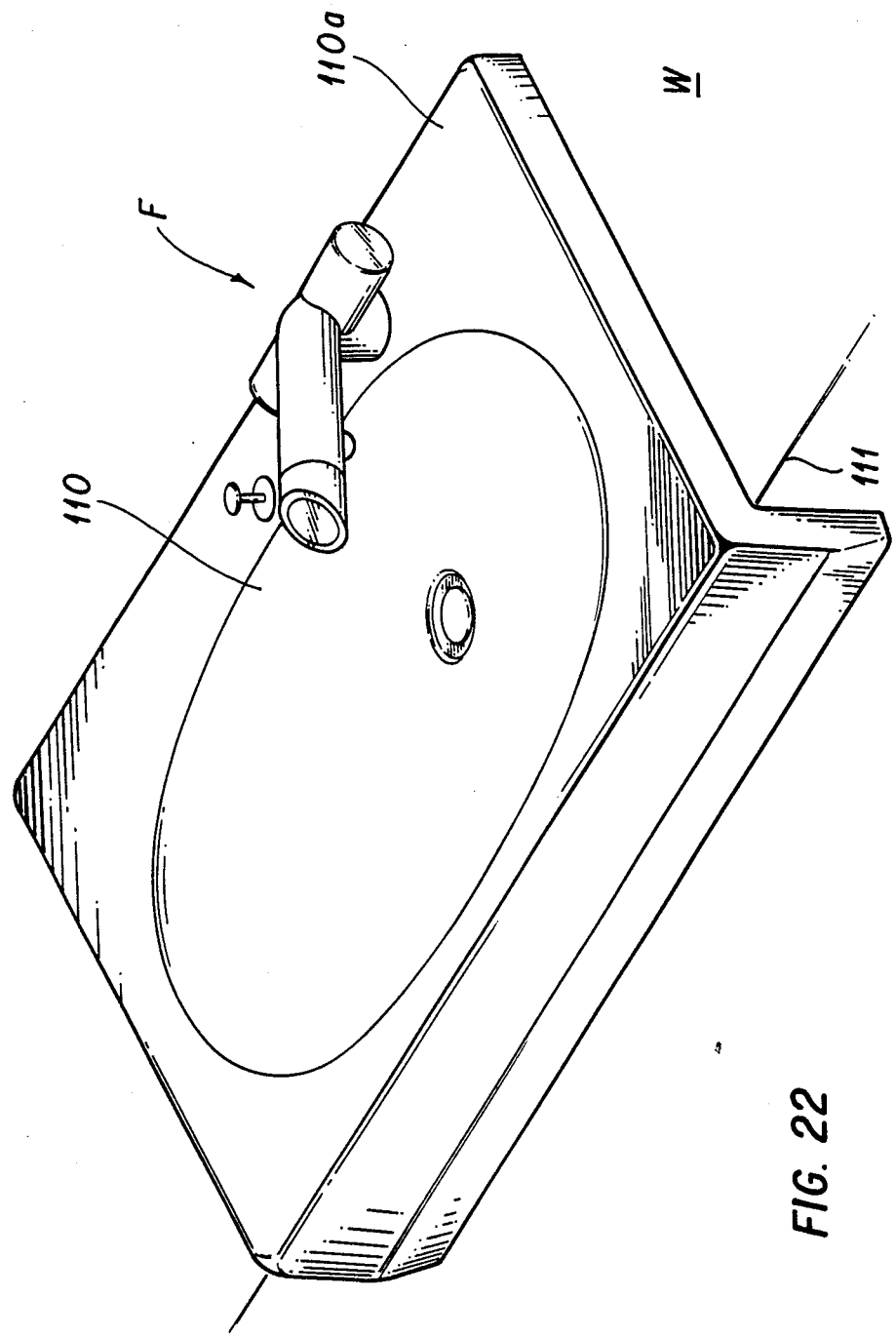
FIG. 22 is a perspective view of a washbasin provided with a faucet of the second embodiment of the present invention in which an automatically operating valve for controlling water flow is incorporated.

In FIG. 22, a washbasin W equipped with the faucet F is shown.

As shown in the drawing, the faucet F is fixedly mounted on the rear top surface 110a of a washbowl 110 which is supported by a wash counter 111.

Figure 23:
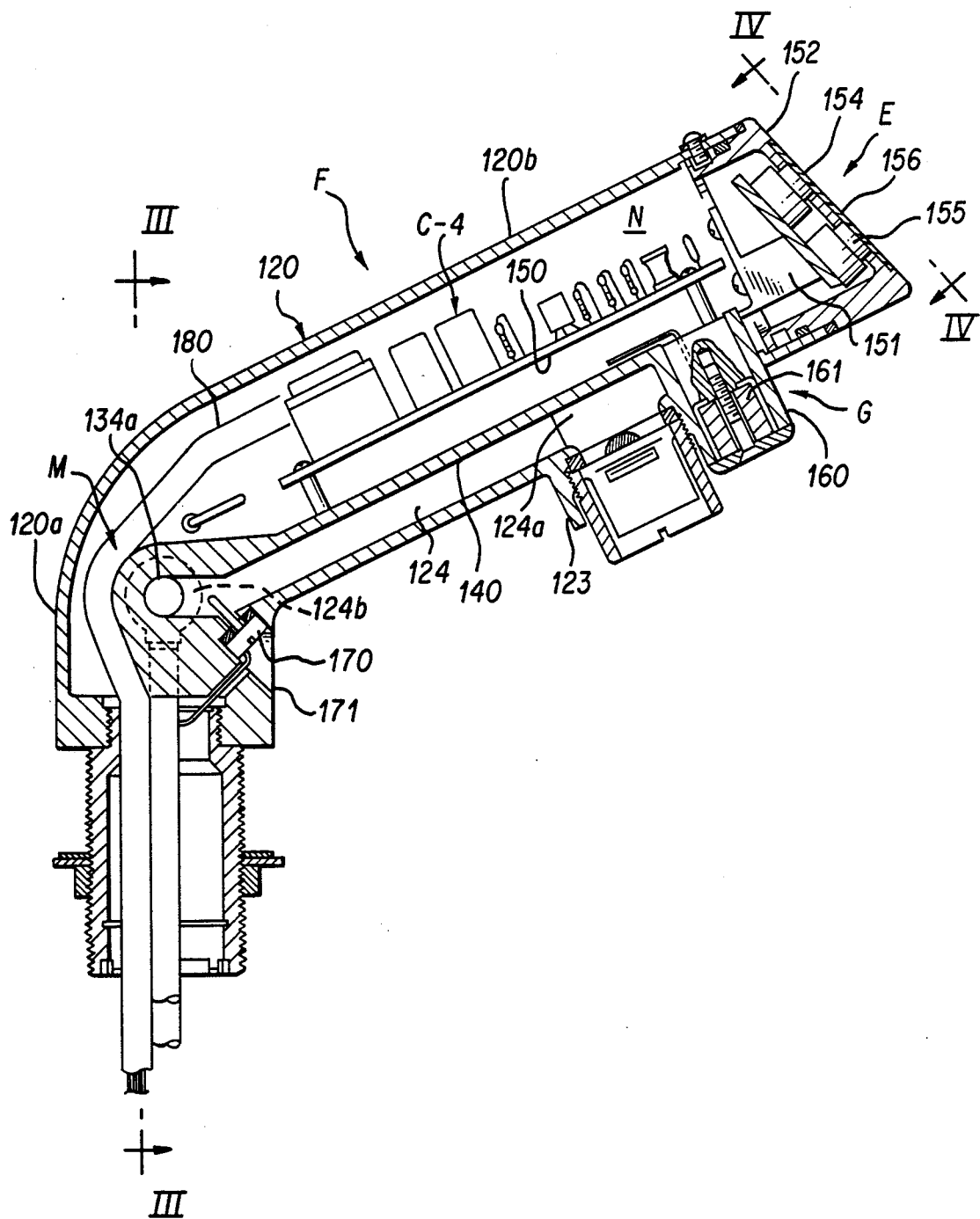
FIG. 23 is a cross-sectional view of the faucet showing the inner structure of the faucet.
Figure 24:
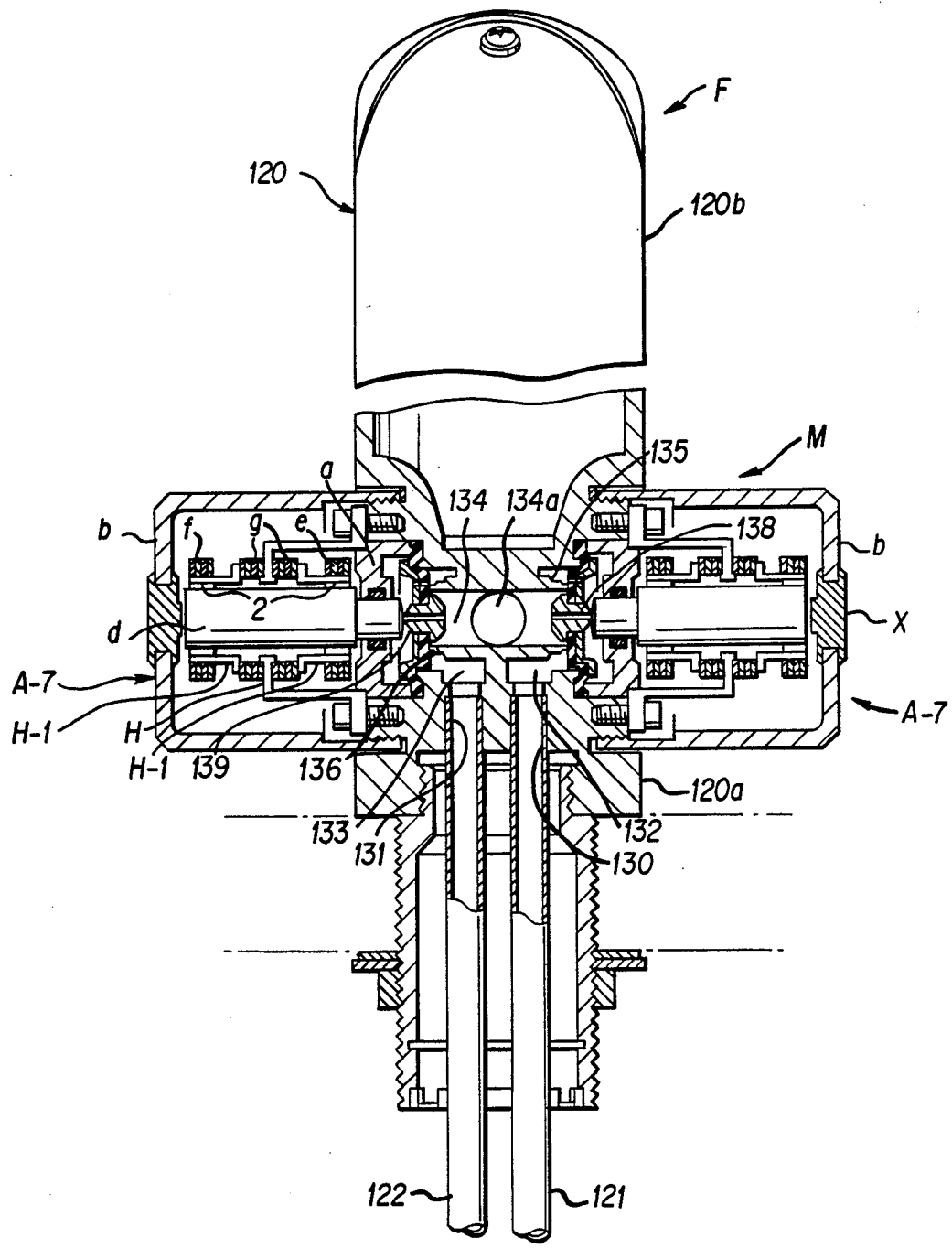
FIG. 24 is a cross sectional view of the above-mentioned automatically operating valve taken along the line III—III of FIG. 23.

FIG. 23 and FIG. 24 show the inner structure of the faucet F, wherein numeral 120 indicates a faucet body and such a faucet body 120 comprises a vertical base portion 120a and a cylindrical inclined tap portion 120b which has the proximal portion thereof integrally connected to the vertical base portion 120a and the upper end thereof inclined in a forward direction relative to the vertical base portion 120a.

In the vertical base portion 120a of the faucet body 120, a mixing valve M for mixing hot water and cold water is incorporated.

The mixing valve M is, as described in detail later, constructed such that a cold water supply pipe 121 and a hot water supply pipe 122 are connected to the inflow side of the mixing valve M, and to the outflow side of the mixing valve M a proximal end opening 124b of an outflow passage 124 is connected, while the outflow passage 124 has the distal end thereof connected to a tap opening 123.

As can be readily understood from FIG. 23, the inclined tap portion 120b of the faucet body 120 is divided by a partition 140 to define the outflow passage 124 and a watertight space N and the control device C-4 is accommodated at the center of the watertight space N.

Namely, in the water-tight space N, a control device C-4 and operating boards E,G for transmitting control signals to the control device C-4 are disposed.

In this manner, according to this embodiment, since the mixing valve M and the control device C-4 are integrally and compactly accommodated in the faucet body 120, the space necessary for mounting the faucet F can be minimized and the space in a chamber such as the washroom can be efficiently utilized and the electric wiring operation necessary for operating the faucet F can be carried out readily.

Furthermore, since the mixing valve M is mounted on the proximal end of the faucet body 120, the stability of the faucet F is improved.

Still furthermore, since the mixing of hot water and cold water is conducted at the proximal end of the faucet body 120, the outflow passage 124 of a sufficiently long distance is defined between the mixing valve M and the tap opening 123, and hot water and cold water are mixed sufficiently in the outflow passage 124 to produce the tap water of a desired temperature.

Although the mixing valve M, the control device C-4 and the operating boards E,G may have any suitable constructions depending on the place where the faucet F is installed or other conditions, in this embodiment, they have the following preferred constructions.

The construction of the mixing valve M is explained first. In FIG. 24, numerals 130,131 indicate a pair of inflow passages formed at both sides in the lower end of the vertical base portion 120a of the faucet body 120.

The inflow passages 130,131 function as a cold-water supply passage and a hot-water supply passage respectively and have their respective lower openings connected with the cold-water supply passage 121 and the hot-water supply passage 122.

On the other hand, the inflow passages 130,131 have their respective upper openings communication with a pair of chambers 132,133 formed at respective side walls of the vertical base portion 120a of the faucet 120.

At the central portion of the vertical base portion 120a of the faucet body 120, a T-shaped passage 134 is formed.

The T-shaped passage 134 functions as a mixing passage of the mixing valve M and has an outside opening 134a thereof communicating with the outflow passage 124 and a pair of bifurcated openings communicated with the pair of chambers 132,133.

Furthermore, at the bifurcated openings of the T-shaped passage 134, a pair of valve seats 135,136 are provided respectively. A pair of valve bodies 137,138 in the form of a diaphragm are movably disposed in the vertical base portion 120a of the faucet body 120 in a horizontal direction transverse to the longitudinal axis of the vertical base portion 120a and the valve bodies 137,138 are capable of coming into contact with the valve seats 135,136 to close or open the mixing valve M.

On both side walls of the vertical base portion 120a of the faucet body 120, a pair of piezoelectric actuators A-7,A-7 are mounted as shown in FIG. 24. These piezoelectric actuators A-7,A-7 have substantially the same construction as the piezoelectric actuators A-5,A-5 of the automatically operating valve for regulating water flow shown in FIG. 18.

Namely, each piezoelectric actuator A-7 is provided with the manual plunger forwarding means x which is illustrated as a manual plunger forwarding button mounted on the central portion of the rear wall b.

Accordingly, in case the automatically operating valve for regulating water flow is stopped with the valve being in an opened condition due to any accident such as the cutting off of the electricity, the valve can be completely closed by pressing the manual plunger forwarding means x as explained previously in view of the modification 4 of the first embodiment.

Figure 26:
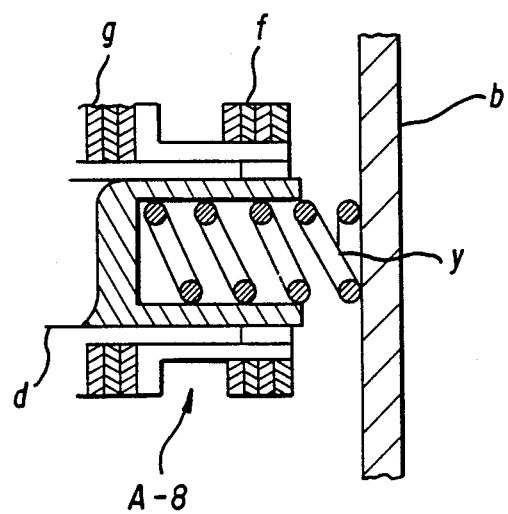
FIG. 26 is an explanatory view of the faucet of a modification of this embodiment.

Furthermore, in FIG. 26, another example of the piezoelectric actuators A-7,A-7 is illustrated as piezoelectric actuators A-8,A-8 and the piezoelectric actuators A-8,A-8 are actuated such that when the pulse-like voltage is not applied to the piezoelectric elements e,f,g, the clamping force is not applied to the plunger d and a compressed spring y, which constantly applies a biasing force to the plunger d toward a valve-closing direction, is disposed between the rear end of the plunger d and the rear wall b of the actuator casing c.

Due to this construction, when an accident such as the cutting off of the electricity occurs, the clamping force on the plunger d is released and the plunger d is extended in a forward direction so as to close the valve completely.

The control device C-4 for controlling the operation of the piezoelectric actuators A-7,A-7 which are disposed in the inclined tapping portion 120b of the faucet body 120 and the operating boards E,G which transmit control signals to the control device C-4 are explained hereinafter.

As shown in FIG. 23, a printed circuit board 150 which may have some flexibility is disposed in the control-device accommodating space N and the control device C-4 is mounted on the printed circuit board 150.

To explain the construction of the operating board E, the operating board E substantially comprises a plurality of touch switches mounted on the distal-end surface of the inclined tap portion 120b.

Figure 25:
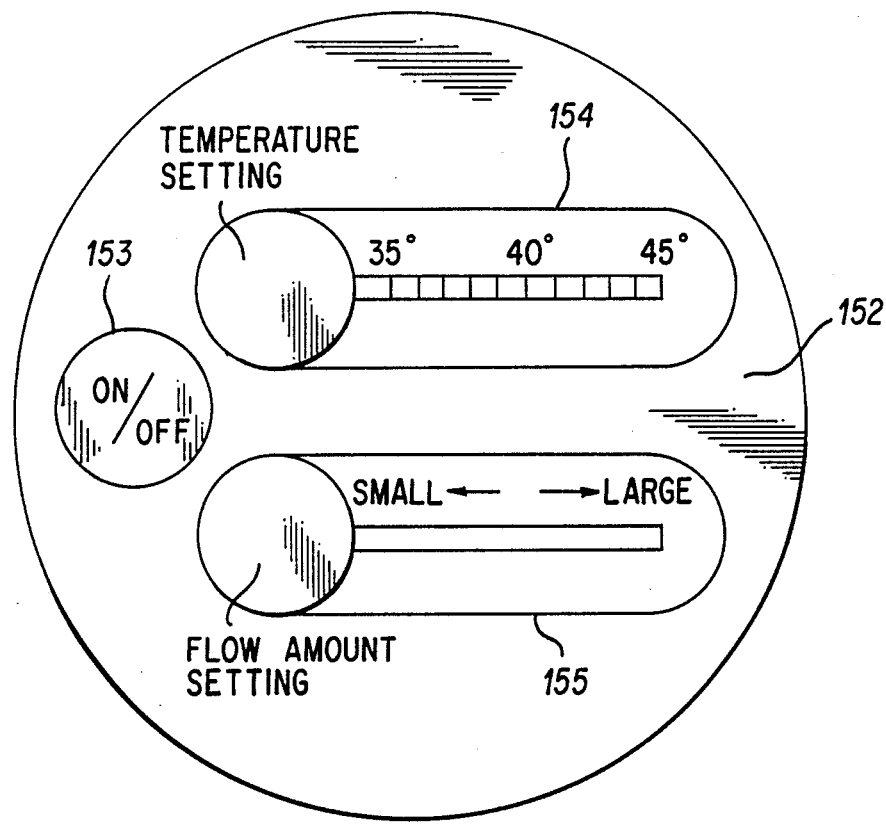
FIG. 25 is a side view of the above-mentioned automatically operating valve seen from a direction of the line IV—IV of FIG. 23.

Namely, as shown in FIG. 25, on a slanted wall 152 provided at the distal end of the inclined tap portion 120b and located above a switch mounting space 151, a plurality of touch switches including a power switch 153, a mixing temperature set switch 154 and a mixing flow amount set switch 155 are mounted.

With the manipulation of the touch switches 153,154,155, the mixing valve M is operated by way of the control device C-4 and the mixed water of a desired temperature and a desired flow amount is tapped from the tap opening 123.

On the slanted wall 152 which is provided with the touch switches 153,154,155 an operation indication plate 156 made of a resilient thin membrane sheet is adhered as shown in FIG. 23 so that an operator of the faucet F can manipulate the touch switches 153,154,155 accurately reading the operation indications on the plate 156.

The operating board G is disposed at the lower peripheral wall of the inclined tap portion 120b and adjacent to the tap opening 123. The operating board G comprises a sensor mounting sleeve 160 integrally formed in the inclined tap portion 120b and a hand detecting sensor 161 mounted in the sensor mounting sleeve 160. Due to such a construction, when a user forwards his hand below the tap opening 123, the hand detecting sensor 161 detects the hand and generates a sensor signal and the signal is transmitted to the control device C-4 and based on the sensor signal, the control device C-4 transmits a control signal to piezoelectric actuators A-7,A-7 of the mixing valve M to start the tapping operation with a temperature control and flow amount control.

A dual-type light focusing sensor can be used as the hand detecting sensor 161.

In FIG. 23, numeral 170 indicates a temperature detecting sensor and a sensor element of the sensor 170 extends toward the distal end of the outflow passage 124. Numeral 171 indicates a waterproof cover.

With the above construction, the temperature detecting sensor 170 detects the temperature Tm of the mixed water and the control device C-4 carries out the PID control based on the difference between the temperature Tm and the predetermined temperature Ts preset by a temperature set switch 154 and transmits control signals to the drive circuits of piezoelectric actuators A-7,A-7.

As shown in FIG. 23, a wire protective sleeve 180 extends into the control-device accommodating space N and a plurality of lead wires, which are connected with the control device C-4 and touch switches 153,154,155 respectively, are all shielded and protected in the sleeve 180.

Figure 27:
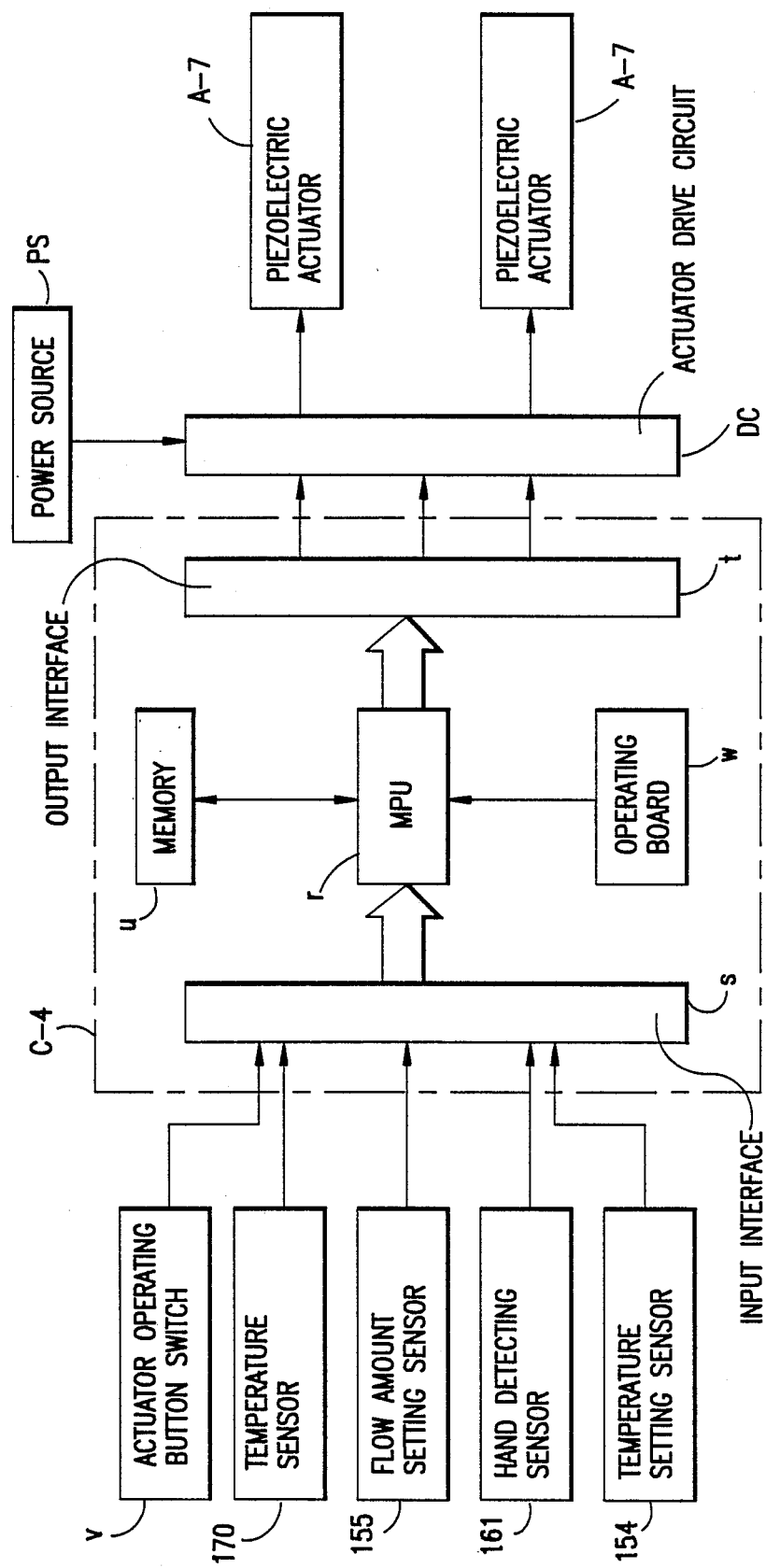
FIG. 27 is a block diagram of the control device of the faucet.

In FIG. 27 which shows the construction of the control device C-4, a power switch 153, the temperature set switch 154, flow set switch 155, a hand detecting sensor 161 and the temperature detecting sensor 170 are connected to the input interface s and a pair of the piezoelectric actuators A-7,A-7 for regulating cold water and hot water respectively are connected to the output interface t.

The manner in which the faucet F having the above construction is operated is described hereinafter in conjunction with FIG. 23, FIG. 24 and FIG. 27.

As shown in FIG. 27, the desired temperature and flow amount of the mixed water are preset by manipulating the temperature set switch 154 and the flow amount setting switch 155.

Thereafter, when a user extends his hand toward the tap opening 123, the hand detecting sensor 161 detects the hand and generates a sensor signal as an output.

Based on this sensor signal, the control device C-4 reads out the operation sequence program of the piezoelectric elements e,f,g from the memory u and based on the above program and the difference between the sensor detected temperature and flow amount and the preset temperature and flow amount, the control device C-4 carries out the PID control and regulates the temperature and flow amount of the mixed water which is produced by the mixing valve M and is tapped from the tap opening 123.

In the above operation, due to the provision of the piezoelectric actuators, the plunger d can be moved either in a forward direction or a backward direction by a stroke of several $\mu m$ per pulse like an inchworm so that the opening rates of the valve bodies 137,138 are accurately and finely regulated resulting in the accurate and fine control of the temperature and the flow amount of the mixed water and the mixed water of a desired temperature and a desired flow amount is tapped from the tap opening 123.

The changing of the temperature or the flow amount of the mixed water can be readily carried out by manipulating the temperature setting switch 154 or the flow amount setting switch 155.

In this embodiment, by installing a flow amount detecting sensor in the outflow passage 124, the actual flow amount can be detected and based on the detected flow amount value, the control device C-4 can regulate the flow amount of the mixed water more efficiently.

Third Embodiment

This embodiment relates to an automatic water supply system.

Figure 28:
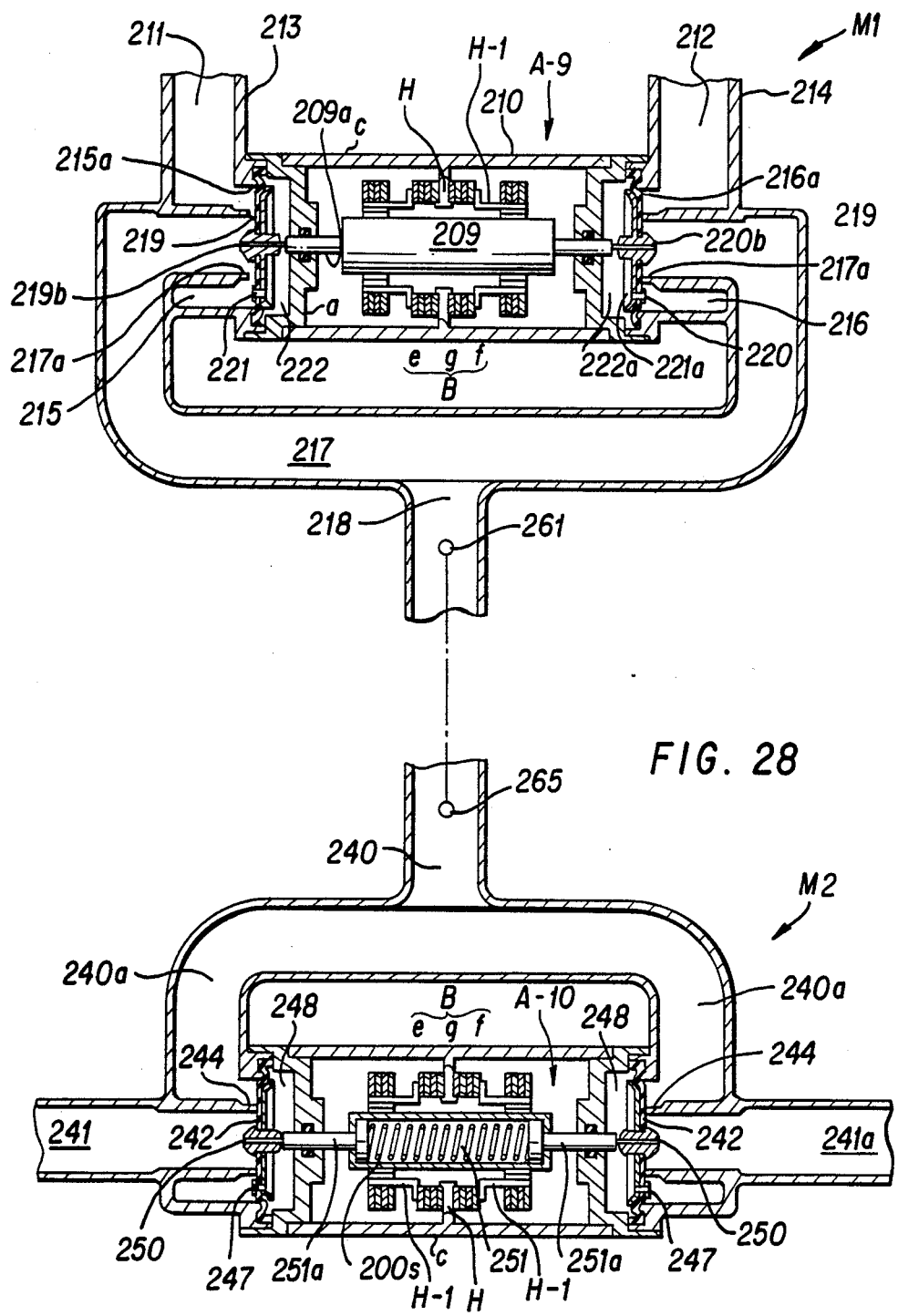
FIG. 28 is a cross-sectional front view of the automatic water supply system of the third embodiment of the present invention provided with an automatically operating valve for controlling water flow.

FIG. 28 shows the automatic water supply system which substantially comprises a mixing valve M1 for mixing cold water and hot water and a flow direction control valve M2 for selectively changing the flow direction of the mixed water, for example, from a shower head to a bath tub or vice versa.

The construction of the mixing valve M1 is firstly explained.

In FIG. 28, numeral 210 indicates a cylindrical-box-like casing and the casing 210 is provided with a pair of inflow passages 211,212 at both ends thereof respectively.

The inflow passages 211,212 function as a cold water passage and a hot water passage respectively and have their outer openings communicating with a cold-water pipe 213 and a hot-water pipe 214, while their inner openings are communicating with a pair of chambers 215,216.

At the center of the casing 210, an outflow passage 217 is provided.

The outflow passage 217 functions as a mixed water passage and has the outer opening thereof communicating with a mixed water pipe 218 and inner bifurcated openings communicating with chambers 215,216 by way of diaphragms 219,220.

Main valve seats 217a,217a are formed in both ends of the bifurcated openings.

Between two main valve seats 217a,217a, an automatically operating valve for regulating water flow which is provided with a piezoelectric actuator A-9 is disposed and the valve has the following construction.

Namely, the automatically operating valve for regulating water flow is constructed such that the piezoelectric actuator A-9 is operated based on the same principle as the piezoelectric actuator A-1 provided that both ends of the plunger 209 are utilized for acting on the diaphragms 219,220 which work as valve bodies.

Such diaphragms 219,220 are capable of retractably coming into contact with main valve seats 217a,217a and are arranged such that the outer peripheries thereof are watertightly attached to inner walls 215a,216a of the pair of chambers 215,216.

Due to such construction, when the piezoelectric actuator A-9 is actuated, the plunger 209 moves either in a left or right direction. When, for example, the plunger 209 moves in a left direction, the distal end of an actuating rod 209a which is attached to the left extremity of the plunger 209 comes into contact with a pilot opening 219b of the diaphragm 219, while the other distal end of an actuating rod 209a which is attached to the right extremity of the plunger 209 comes into contact with or moves away from the pilot opening 220b of the diaphragm 220.

Accordingly, with the actuation of the piezoelectric actuator A-9, cold water supplied from the cold water supply pipe 213 and the hot water supplied from the hot water supply pipe 214 are mixed and the mixed water is discharged from the outflow passage 217.

In FIG. 28, numerals 221,221a indicate orifices and such orifices have a diameter which is smaller than the diameter of the pilot opening 219b,219b. Numerals 222,222a indicate a pair of pressure chambers.

The flow direction control valve M2 for selectively changing the flow direction of the mixed water is disposed downstream of the above-mentioned mixing valve M1 and has the following construction.

The flow direction control valve M2 has substantially the same construction as that of the mixing valve M1 in terms of the casing and the flow passages and the automatically operating valve for regulating water flow, is disposed between the main valve seats 244,244 and has a piezoelectric actuator A-10 which has the same construction as the piezoelectric actuator A-9 with the provision that the flow passages of the flow direction control valve M2 have a symmetrical relationship with respect to the flow passages of the mixing valve M1 and the construction of the plunger is considerably different from that of the plunger 209 of the mixing valve M1.

Namely, a flow passage 240 which communicates with the mixed water pipe 218 of the mixing valve M1 is bifurcated to a pair of inflow passages 240a,240a and a pair of outflow passages 241,241a communicate with the inflow passages 240a,240a.

With respect to the plunger, the plunger comprises a cylindrical plunger case 251, a pair of actuating rods 251a,251a which are slidably disposed at both ends of the plunger case 251 and extend outwardly from both ends of the plunger case 251, and a spring 200S which is interposed between the proximal ends of the plunger case 251 to apply a biasing force to the actuating rods 251a,251a. Due to such construction, as the plunger is moved in either direction by the actuation of the piezoelectric actuator A-10, the actuating rods 251a,251a act on the diaphragms 242,242 respectively.

In the drawing, numerals 250,250 indicate pilot openings, numerals 247,247 indicate bleed openings and numeral 248,248 indicate a pressure chambers.

Figure 29:
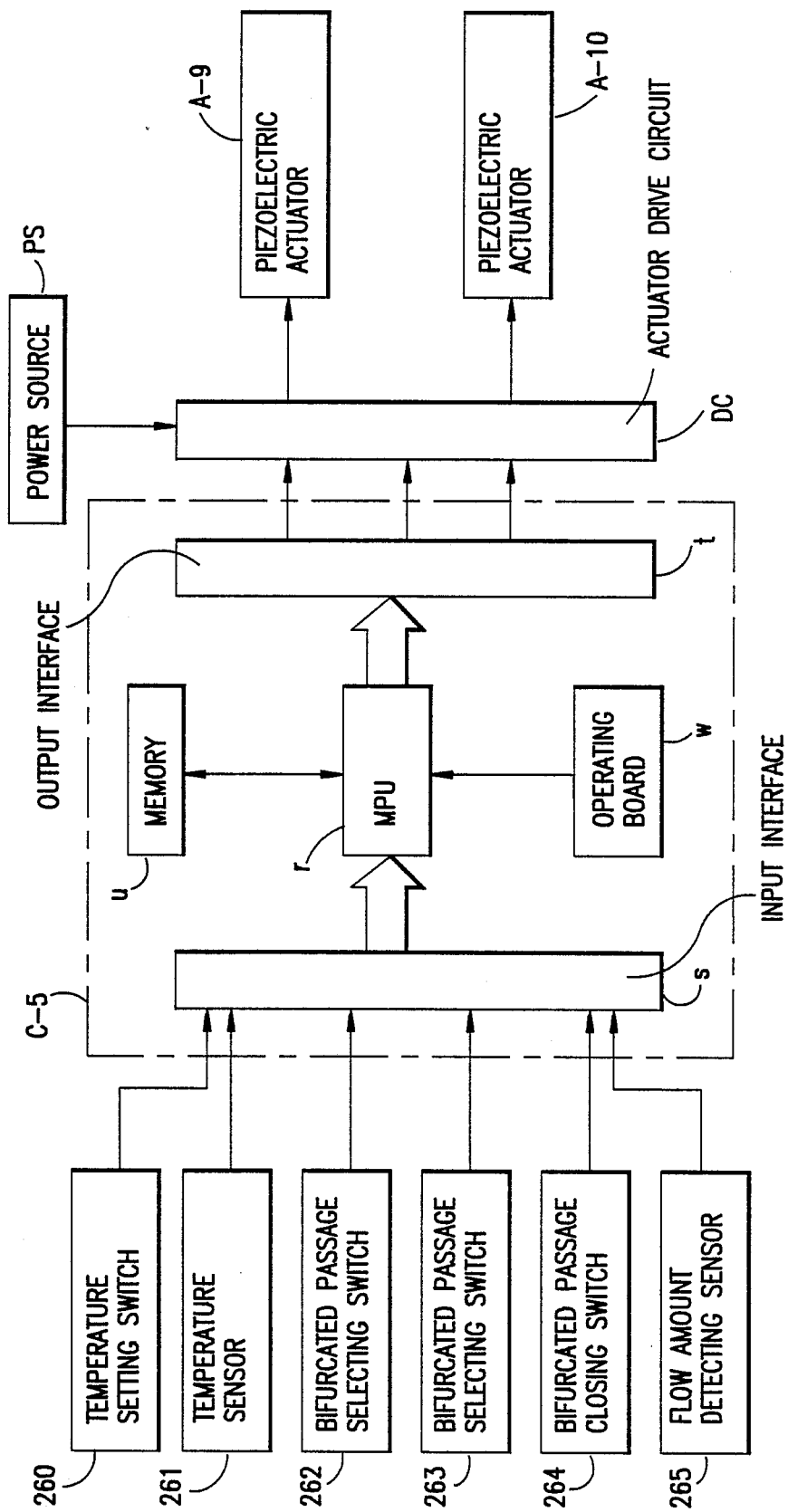
FIG. 29 is a block diagram of the control device applicable to the automatic water supply system.

FIG. 29 shows a control device C-5 for controlling the actuation of the piezoelectric actuators A-9 and A-10.

As shown in FIG. 29, the control device C-5 has the same construction as the control device C-1, wherein a temperature setting switch 260, a temperature detecting sensor 261, bifurcated passage selecting switches 262,263, a bifurcated passages closing switch 264 and a flow amount detecting sensor 265 are connected to the input interface s, while the piezoelectric actuators A-9,A-10 for regulating the flow of the mixing valve M1 and the flow direction control valve M2 are connected to the output interface t.

Following the sequential operation program read out from the memory u, the piezoelectric actuator A-9 is actuated to effect the temperature control of the mixed water and the piezoelectric actuator A-10 is actuated to effect the flow amount control of the mixed water as well as the selection of the flow direction of the mixed water, for example, from a shower head to a bath tub or vice versa.

The operation of the piezoelectric actuators A-9,A-10 is further explained in view of FIG. 28 and FIG. 29.

As shown in FIG. 28, the temperature of the mixed water which is produced by the mixing valve M1 and flows in the mixed water pipe 218 is detected by the temperature detecting sensor 261 and a detected temperature Tm is transmitted to the control device C-5.

The control device C-5 carries out the PID control based on the difference $\Delta T$ between the detected temperature Tm and the preset desired temperature Ts of the mixed water and actuates the piezoelectric actuator A-9 so as to open or close the diaphragms 219,219 which form the valve bodies to a predetermined setting and the flow amount of hot water and cold water to the mixed water pipe 218 is regulated and the mixed water of a desired temperature is produced in the mixed water pipe 218.

Subsequently, in case that the above difference $\Delta T$ between the detected temperature Tm and the preset desired temperature Ts of the mixed water exceeds the allowable degree or either one of the bifurcated passage switches 262,263 is manipulated, the control device C-5 reads out the sequential operation program from the memory u and transmits control signals to the drive circuits to cause the circuits to generate pulse-like voltage which is applied to the piezoelectric elements e,f,g of the piezoelectric actuator A-10 and the plunger case 251 moves either in a left or right direction.

Following the movement of the plunger case 251, the diaphragms 242,242 are driven to completely shut or terminate the communication between the mixed water pipe 240, which communicates with the mixed water supply pipe 218, and both outflow passages 241,241 or to shut or terminate the communication between the mixed water pipe 240 and either one of the outflow passages 241,241 whereby the supply of the mixed water can be completely stopped or the mixed water can be supplied to only either one of the outflow passages 241,241 to effect the changing of the flow direction.

Furthermore, in this embodiment, since the mixing valve M1 and the flow direction control valve M2 employ the diaphragms 219,219,242,242 as valve bodies thereof and such diaphragms 219,219,242,242 are operated by the plungers of the the piezoelectric actuators A-9,A-10, these valves M1,M2 can be opened or closed with the least electricity thus contributing to the saving of energy, while assuring the accurate and prompt temperature control and flow direction control.

What is claimed:

1. An automatically operating valve for regulating water flow comprising
   (a) a casing having a pair of inflow passage means and a single outflow passage means and a pair of communicating portions disposed in said casing and each having a respective valve seat means formed therein, said inflow passage means and said outflow passage means communicating with each other by way of said communicating portions,
   (b) a pair of valve body means operably disposed in said casing and each capable of moving toward or away from a respective one of said valve seat means and coming into contact with said respective valve seat means for regulating flow of water through a respective one of said communicating portions, and
   (c) a piezoelectric actuator disposed in said casing between said valve seat means for operating said pair of valve body means, said piezoelectric actuator comprising a cylindrical piezoelectric body and a plunger which is concentrically disposed in said body, said plunger being reciprocable axially within said piezoelectric body upon activation of said piezoelectric body and having a pair of ends each positioned to engage a respective one of said valve body means.

2. An automatically operating valve according to claim 1, wherein each of said valve body means is in the form of a diaphragm.

3. An automatically operating valve for regulating water flow comprising
   (a) a casing having a single inflow passage means and a pair of outflow passage means and a pair of communicating portions disposed in said casing and each having a respective valve seat means formed therein, said inflow passage means and said outflow passage means communicating with each other by way of said communicating portions,
   (b) a pair of valve body means operably disposed in said casing and each capable of moving toward or away from a respective one of said valve seat means and coming into contact with said respective valve seat means for regulating flow of water through a respective one of said communicating portions, and
   (c) a piezoelectric actuator disposed in said casing between said valve seat means for operating said pair of valve body means, said piezoelectric actuator comprising a cylindrical piezoelectric body and a plunger which is concentrically disposed in said body, said plunger being reciprocable axially within said piezoelectric body upon activation of said piezoelectric body and having a pair of ends each positioned to engage a respective one of said valve body means.

4. An automatically operating valve for regulating water flow according to claim 3, wherein each of said valve body means is in the form of a diaphragm.

5. An apparatus including automatically operating valves for regulating water flow comprising
   (a) a first casing having a pair of inflow passage means and a single outflow passage means and a pair of communicating portions disposed in said first casing and each having a respective valve seat means formed therein, said first casing inflow passage means and said first casing outflow passage means communicating with each other by way of said first casing communicating portions,
   (b) a pair of valve body means operably disposed in said first casing and each capable of moving toward or away from a respective one of said first casing valve seat means and coming into contact with said respective first casing valve seat means for regulating flow of water through a respective one of said first casing communicating portions, and
   (c) a first piezoelectric actuator disposed in said first casing between said first casing valve seat means for operating said pair of first casing valve body means,
   (d) a second casing having a single inflow passage means and a pair of outflow passage means and a pair of communicating portions disposed in said second casing and each having a respective valve seat means formed therein, said second casing inflow passage means and said second casing outflow passage means communicating with each other by way of said second casing communicating portions,
   (e) a pair of valve body means operably disposed in said second casing and each capable of moving toward or away from a respective one of said second casing valve seat means and coming into contact with said respective second casing valve seat means for regulating flow of water through a respective one of said second casing communicating portions, and
   (f) a second piezoelectric actuator disposed in said second casing between said second casing valve seat means for operating said second casing pair of valve body means, and
   (g) conduit means communicating between said first casing outflow passage means and said second casing inflow passage means.

6. An apparatus according to claim 5, wherein each of said piezoelectric actuator means comprises a cylindrical piezoelectric body made of a plurality of ring-like piezoelectric elements and a plunger which is concentrically disposed in said body, said plunger being reciprocable axially within said piezoelectric body upon activation of said piezoelectric elements and having a pair of ends each positioned to engage a respective one of said valve body means.

7. An apparatus according to claim 5, wherein each of said valve body means is in the form of a diaphragm.

8. An automatically operating valve for regulating water flow comprising
   (a) a casing having a pair of inflow passage means and a single outflow passage means and a pair of communicating portions disposed in said casing and each having a respective valve seat means formed therein, said inflow passage means and said outflow passage means communicating with each other by way of said communicating portions, (b) a pair of valve body means operably disposed in said casing and each capable of moving toward or away from a respective one of said valve seat means and coming into contact with said respective valve seat means for regulating flow of water through a respective one of said communicating portions, and (c) a piezoelectric actuator disposed in said casing between said valve seat means for operating said pair of valve body means, said piezoelectric actuator comprising a cylindrical piezoelectric body made of a plurality of ring-like piezoelectric elements and a plunger which is concentrically disposed in said body, said plunger being reciprocable axially within said piezoelectric body upon activation of said piezoelectric elements and having a pair of ends each positioned to engage a respective one of said valve body means.

9. An automatically operating valve according to claim 8, wherein each of said valve body means is in the form of a diaphragm.

10. An automatically operating valve for regulating water flow comprising (a) a casing having a single inflow passage means and a pair of outflow passage means and a pair of communicating portions disposed in said casing and each having a respective valve seat means formed therein, said inflow passage means and said outflow passage means communicating with each other by way of said communicating portions, (b) a pair of valve body means operably disposed in said casing and each capable of moving toward or away from a respective one of said valve seat means and coming into contact with said respective valve seat means for regulating flow of water through a respective one of said communicating portions, and (c) a piezoelectric actuator disposed in said casing between said valve seat means for operating said pair of valve body means, said piezoelectric actuator comprising a cylindrical piezoelectric body made of a plurality of ring-like piezoelectric elements and a plunger which is concentrically disposed in said body, said plunger being reciprocable axially within said piezoelectric body upon activation of said piezoelectric elements and having a pair of ends each positioned to engage a respective one of said valve body means.

11. An automatically operating valve for regulating water flow according to claim 10, wherein each of said valve body means is in the form of a diaphragm.

* * * * *